(12) United States Patent
Vrazel et al.

(10) Patent No.: US 7,149,256 B2
(45) Date of Patent: Dec. 12, 2006

(54) MULTILEVEL PULSE POSITION MODULATION FOR EFFICIENT FIBER OPTIC COMMUNICATION

(75) Inventors: Michael G. Vrazel, Atlanta, GA (US); Stephen E. Ralph, Atlanta, GA (US); Vincent Mark Hietala, Albuquerque, NM (US)

(73) Assignee: Quellan, Inc., Atlanta, GA (US)

( * ) Notice: Subject to any disclaimer, the term of this patent is extended or adjusted under 35 U.S.C. 154(b) by 936 days.

(21) Appl. No.: 10/112,586

(22) Filed: Mar. 29, 2002

(65) Prior Publication Data

US 2003/0072050 A1  Apr. 17, 2003

Related U.S. Application Data

(60) Provisional application No. 60/279,655, filed on Mar. 29, 2001.

(51) Int. Cl.
*H04L 27/04* (2006.01)
*H04B 10/12* (2006.01)

(52) U.S. Cl. ..................... 375/295; 398/189
(58) Field of Classification Search ............... 375/286, 375/287, 292, 295, 316, 259; 398/182, 189, 398/202
See application file for complete search history.

(56) References Cited

U.S. PATENT DOCUMENTS

| | | | |
|---|---|---|---|
| 2,632,058 A | 3/1953 | Gray | |
| 3,445,771 A | 5/1969 | Clapham et al. | |
| 3,571,725 A | 3/1971 | Kaneko et al. | |
| 3,599,122 A | 8/1971 | Leuthoki | 333/29 |
| 3,714,437 A | 1/1973 | Kinsel | |
| 3,806,915 A | 4/1974 | Higgins et al. | |
| 3,977,795 A | 8/1976 | Buschmann | |
| 4,201,909 A * | 5/1980 | Dogliotti et al. | 398/189 |
| 4,287,756 A | 9/1981 | Gallagher | |
| 4,288,872 A | 9/1981 | Tamburelli | 375/14 |
| 4,349,914 A | 9/1982 | Evans | |
| 4,363,127 A | 12/1982 | Evans et al. | |
| 4,386,339 A | 5/1983 | Henry et al. | |
| 4,387,461 A | 6/1983 | Evans | |
| 4,393,499 A | 7/1983 | Evans | |

(Continued)

FOREIGN PATENT DOCUMENTS

EP     0 527 966 B1    9/1994

(Continued)

OTHER PUBLICATIONS

André; InP DHBT Technology and Design Methodology for High-Bit-Rate Optical Communications Circuits; IEEE Journal of Solid-State Circuits; vol. 33, No. 9, Sep. 1998; pp. 1328-1335.

(Continued)

*Primary Examiner*—Tesfaldet Bocure
(74) *Attorney, Agent, or Firm*—King & Spalding LLP

(57) ABSTRACT

Decreasing the average transmitted power in an optical fiber communication channel using multilevel amplitude modulation in conjunction with Pulse Position Modulation (PPM). This multilevel PPM method does not entail any tradeoff between decreased power per channel and channel bandwidth, enabling a lower average transmitted power compared to On/Off Keying (OOK) with no reduction in aggregate data rate. Therefore, multilevel PPM can be used in high-speed Dense Wavelength Division Multiplexed (DWDM) systems where the maximum number of channels is traditionally limited by nonlinear effects such as self-phase modulation (SPM), cross-phase modulation (XPM), four-wave mixing (FWM), stimulated Brillouin scattering (SBS), and stimulated Raman scattering (SRS). This modulation technique can enable an increased number of channels in DWDM systems, thereby increasing aggregate data rates within those systems.

16 Claims, 10 Drawing Sheets

U.S. PATENT DOCUMENTS

| | | | |
|---|---|---|---|
| 4,410,878 A * | 10/1983 | Stach | 341/56 |
| 4,464,771 A | 8/1984 | Sorenson | |
| 4,470,126 A | 9/1984 | Haque | |
| 4,475,227 A | 10/1984 | Belfield | 381/30 |
| 4,479,266 A | 10/1984 | Eumurian et al. | |
| 4,521,883 A | 6/1985 | Roché | |
| 4,580,263 A | 4/1986 | Watanabe et al. | |
| 4,584,720 A | 4/1986 | Garrett | |
| 4,618,941 A | 10/1986 | Linder et al. | |
| 4,646,173 A | 2/1987 | Kammeyer et al. | 360/51 |
| 4,651,026 A | 3/1987 | Serfaty et al. | |
| 4,751,497 A | 6/1988 | Torii | |
| 4,830,493 A | 5/1989 | Giebeler | |
| 4,847,521 A | 7/1989 | Huignard et al. | |
| 4,864,590 A | 9/1989 | Arnon et al. | |
| 4,873,700 A | 10/1989 | Wong | 375/76 |
| 4,912,726 A | 3/1990 | Iwamatsu et al. | |
| 4,942,593 A | 7/1990 | Whiteside et al. | |
| 4,953,041 A | 8/1990 | Huber | 360/46 |
| 4,959,535 A | 9/1990 | Garrett | |
| 4,978,957 A | 12/1990 | Hotta et al. | |
| 5,007,106 A | 4/1991 | Kahn et al. | |
| 5,008,957 A | 4/1991 | Klyono | |
| 5,012,475 A | 4/1991 | Campbell | |
| 5,067,126 A | 11/1991 | Moore | |
| 5,072,221 A | 12/1991 | Schmidt | |
| 5,111,065 A | 5/1992 | Roberge | |
| 5,113,278 A | 5/1992 | Degura et al. | |
| 5,115,450 A | 5/1992 | Arcuri | |
| 5,121,411 A | 6/1992 | Fluharty | |
| 5,128,790 A | 7/1992 | Heidemann et al. | |
| 5,132,639 A | 7/1992 | Blauvelt et al. | |
| 5,151,698 A | 9/1992 | Pophillat | |
| 5,181,136 A | 1/1993 | Kavehrad et al. | |
| 5,182,034 A | 1/1993 | Meyer et al. | |
| 5,184,131 A | 2/1993 | Ikeda | |
| 5,208,833 A | 5/1993 | Erhart et al. | |
| 5,222,103 A | 6/1993 | Gross | |
| 5,223,834 A | 6/1993 | Wang et al. | |
| 5,225,798 A | 7/1993 | Hunsinger et al. | |
| 5,237,590 A | 8/1993 | Kazawa et al. | |
| 5,243,613 A | 9/1993 | Gysel et al. | |
| 5,252,930 A | 10/1993 | Blauvelt | |
| 5,282,072 A | 1/1994 | Nazarathy et al. | |
| 5,283,679 A | 2/1994 | Wedding | |
| 5,291,031 A | 3/1994 | MacDonald et al. | |
| 5,293,406 A | 3/1994 | Suzuki | |
| 5,300,930 A | 4/1994 | Burger et al. | |
| 5,321,543 A | 6/1994 | Huber | |
| 5,321,710 A | 6/1994 | Cornish et al. | |
| 5,327,279 A | 7/1994 | Farina et al. | |
| 5,343,322 A | 8/1994 | Pirio et al. | |
| 5,351,148 A | 9/1994 | Maeda et al. | |
| 5,355,240 A | 10/1994 | Prigent et al. | |
| 5,361,156 A | 11/1994 | Pidgeon | |
| 5,371,625 A | 12/1994 | Wedding et al. | |
| 5,373,384 A | 12/1994 | Hebert | |
| 5,376,786 A | 12/1994 | MacDonald | |
| 5,382,955 A | 1/1995 | Knierim | |
| 5,387,887 A | 2/1995 | Zimmerman et al. | |
| 5,408,485 A | 4/1995 | Ries | |
| 5,413,047 A | 5/1995 | Evans et al. | |
| 5,416,628 A | 5/1995 | Betti et al. | |
| 5,418,637 A | 5/1995 | Kuo | |
| 5,424,680 A | 6/1995 | Nazarathy et al. | |
| 5,428,643 A | 6/1995 | Razzell | |
| 5,428,831 A | 6/1995 | Monzello et al. | 455/296 |
| 5,436,752 A | 7/1995 | Wedding | |
| 5,436,756 A | 7/1995 | Knox et al. | |
| 5,444,864 A | 8/1995 | Smith | 455/84 |
| 5,450,044 A | 9/1995 | Hulick | |
| 5,481,389 A | 1/1996 | Pidgeon et al. | |
| 5,481,568 A | 1/1996 | Yada | |
| 5,483,552 A | 1/1996 | Shimazaki et al. | 375/233 |
| 5,504,633 A | 4/1996 | Van Den Enden | |
| 5,510,919 A | 4/1996 | Wedding | |
| 5,515,196 A | 5/1996 | Kitajima et al. | |
| 5,528,710 A | 6/1996 | Burton et al. | |
| 5,541,955 A * | 7/1996 | Jacobsmeyer | 375/222 |
| 5,548,253 A | 8/1996 | Durrant | |
| 5,557,439 A | 9/1996 | Alexander et al. | 359/130 |
| 5,574,743 A | 11/1996 | van der Poel et al. | |
| 5,589,786 A | 12/1996 | Bella et al. | |
| 5,606,734 A | 2/1997 | Bahu | 455/303 |
| 5,612,653 A | 3/1997 | Dodds et al. | |
| 5,617,135 A | 4/1997 | Noda et al. | 348/12 |
| 5,621,764 A | 4/1997 | Ushirokawa et al. | |
| 5,625,360 A | 4/1997 | Garrity et al. | |
| 5,625,722 A | 4/1997 | Froberg et al. | |
| 5,644,325 A | 7/1997 | King et al. | |
| 5,648,987 A | 7/1997 | Yang et al. | 375/232 |
| 5,670,871 A | 9/1997 | Man et al. | |
| 5,675,600 A | 10/1997 | Yamamoto | |
| 5,678,198 A | 10/1997 | Lemson | |
| 5,689,356 A | 11/1997 | Rainal | |
| 5,691,978 A | 11/1997 | Kenworthy | 370/278 |
| 5,692,011 A | 11/1997 | Nobakht et al. | 375/233 |
| 5,699,022 A | 12/1997 | Tovar | 333/18 |
| 5,706,008 A | 1/1998 | Huntley et al. | |
| 5,721,315 A | 2/1998 | Evans et al. | |
| 5,723,176 A | 3/1998 | Keyworth et al. | |
| 5,751,726 A | 5/1998 | Kim | |
| 5,754,681 A | 5/1998 | Watanabe et al. | |
| 5,757,763 A | 5/1998 | Green et al. | |
| 5,761,243 A | 6/1998 | Russell et al. | |
| 5,764,542 A | 6/1998 | Gaudette et al. | |
| 5,774,505 A | 6/1998 | Baugh | 375/348 |
| 5,783,630 A | 7/1998 | Evans et al. | |
| 5,784,032 A | 7/1998 | Johnston et al. | |
| 5,790,595 A | 8/1998 | Benthin et al. | |
| 5,798,854 A | 8/1998 | Blauvelt et al. | |
| 5,801,657 A | 9/1998 | Fowler et al. | |
| 5,802,089 A | 9/1998 | Link | |
| 5,812,578 A | 9/1998 | Schemmann et al. | |
| 5,825,211 A | 10/1998 | Smith et al. | |
| 5,825,257 A | 10/1998 | Klymyshyn et al. | |
| 5,825,825 A | 10/1998 | Altmann et al. | |
| 5,828,329 A | 10/1998 | Burns | |
| 5,835,848 A | 11/1998 | Bi et al. | 455/24 |
| 5,839,105 A | 11/1998 | Ostendorf et al. | |
| 5,841,841 A | 11/1998 | Dodds et al. | |
| 5,844,436 A | 12/1998 | Altmann | |
| 5,848,139 A | 12/1998 | Grover | |
| 5,850,409 A | 12/1998 | Link | |
| 5,850,505 A | 12/1998 | Grover et al. | |
| 5,852,389 A | 12/1998 | Kumar et al. | |
| 5,859,862 A | 1/1999 | Hikasa et al. | |
| 5,861,966 A | 1/1999 | Ortel | |
| 5,872,468 A | 2/1999 | Dyke | |
| 5,878,390 A | 3/1999 | Kawai et al. | |
| 5,880,870 A | 3/1999 | Sieben et al. | |
| 5,883,910 A | 3/1999 | Link | |
| 5,887,022 A | 3/1999 | Lee et al. | |
| 5,889,759 A | 3/1999 | McGibney | |
| 5,896,392 A | 4/1999 | Ono et al. | |
| 5,912,749 A | 6/1999 | Harstead et al. | |
| 5,920,600 A | 7/1999 | Yamaoka et al. | |
| 5,923,226 A | 7/1999 | Kakura et al. | |
| 5,942,576 A | 8/1999 | Evans et al. | |
| 5,943,380 A | 8/1999 | Marchesani et al. | |
| 5,943,457 A | 8/1999 | Hayward et al. | |
| 5,949,926 A | 9/1999 | Davies | |
| 5,959,032 A | 9/1999 | Evans et al. | |
| 5,959,750 A | 9/1999 | Eskildsen et al. | |

| | | |
|---|---|---|
| 5,965,667 A | 10/1999 | Evans et al. |
| 5,968,198 A | 10/1999 | Hassan et al. |
| 5,978,417 A | 11/1999 | Baker et al. ............. 375/232 |
| 5,983,178 A | 11/1999 | Naito et al. |
| 5,985,999 A | 11/1999 | Dominguez et al. |
| 5,999,300 A | 12/1999 | Davies et al. |
| 6,002,274 A | 12/1999 | Smith et al. |
| 6,002,717 A | 12/1999 | Gaudet |
| 6,009,424 A | 12/1999 | Lepage et al. |
| 6,011,952 A | 1/2000 | Dankberg et al. ........... 455/24 |
| 6,021,110 A | 2/2000 | McGibney |
| 6,028,658 A | 2/2000 | Hamada et al. |
| 6,031,048 A | 2/2000 | Evans et al. |
| 6,031,866 A | 2/2000 | Oler et al. |
| 6,031,874 A | 2/2000 | Chennakeshu et al. |
| 6,034,996 A | 3/2000 | Herzberg |
| 6,035,080 A | 3/2000 | Henry et al. |
| 6,041,299 A | 3/2000 | Schuster et al. |
| 6,052,420 A | 4/2000 | Yeap et al. ............... 375/346 |
| 6,072,364 A | 6/2000 | Jeckeln et al. |
| 6,072,615 A | 6/2000 | Mamyshev |
| 6,078,627 A | 6/2000 | Crayford |
| 6,084,931 A | 7/2000 | Powell, II et al. |
| 6,091,782 A | 7/2000 | Harano |
| 6,093,496 A | 7/2000 | Dominguez et al. |
| 6,093,773 A | 7/2000 | Evans et al. |
| 6,108,474 A | 8/2000 | Eggleton et al. |
| 6,111,477 A | 8/2000 | Klymyshyn et al. |
| 6,118,563 A | 9/2000 | Boskovic et al. |
| 6,118,567 A | 9/2000 | Alameh et al. |
| 6,127,480 A | 10/2000 | Dominguez et al. |
| 6,140,416 A | 10/2000 | Evans et al. |
| 6,140,858 A | 10/2000 | Dumont |
| 6,140,972 A | 10/2000 | Johnston et al. |
| 6,141,127 A | 10/2000 | Boivin et al. |
| 6,141,387 A | 10/2000 | Zhang |
| 6,148,428 A | 11/2000 | Welch et al. |
| 6,151,150 A | 11/2000 | Kikuchi |
| 6,154,301 A | 11/2000 | Harvey |
| 6,163,638 A | 12/2000 | Eggleton et al. |
| 6,169,764 B1 | 1/2001 | Babanezhad ............... 375/233 |
| 6,169,912 B1 | 1/2001 | Zuckerman ............... 455/570 |
| 6,181,454 B1 | 1/2001 | Nagahori et al. |
| 6,191,719 B1 | 2/2001 | Bult et al. |
| 6,201,916 B1 | 3/2001 | Eggleton et al. |
| 6,208,792 B1 | 3/2001 | Hwang et al. |
| 6,211,978 B1 | 4/2001 | Wojtunik ................ 359/114 |
| 6,212,654 B1 | 4/2001 | Lou et al. |
| 6,214,914 B1 | 4/2001 | Evans et al. |
| 6,219,633 B1 | 4/2001 | Lepage |
| 6,222,861 B1 | 4/2001 | Kuo et al. ................ 372/20 |
| 6,226,112 B1 | 5/2001 | Denk et al. |
| 6,236,963 B1 | 5/2001 | Naito et al. |
| 6,259,836 B1 | 7/2001 | Dodds |
| 6,259,847 B1 | 7/2001 | Lenz et al. |
| 6,268,816 B1 | 7/2001 | Bult et al. |
| 6,271,690 B1 | 8/2001 | Hirano et al. ............. 327/75 |
| 6,271,944 B1 | 8/2001 | Schemmann et al. |
| 6,281,824 B1 | 8/2001 | Masuda |
| 6,288,668 B1 | 9/2001 | Tsukamoto et al. |
| 6,289,055 B1 | 9/2001 | Knotz |
| 6,289,151 B1 | 9/2001 | Kazarinov et al. |
| 6,295,325 B1 | 9/2001 | Farrow et al. ............. 375/327 |
| 6,298,459 B1 | 10/2001 | Tsukamoto |
| 6,304,199 B1 | 10/2001 | Fang et al. |
| 6,311,045 B1 | 10/2001 | Domokos ................. 455/78 |
| 6,313,713 B1 | 11/2001 | Ho et al. ................ 333/1.1 |
| 6,317,247 B1 | 11/2001 | Yang et al. ............... 359/245 |
| 6,317,469 B1 | 11/2001 | Herbert |
| 6,341,023 B1 | 1/2002 | Puc |
| 6,356,374 B1 | 3/2002 | Farhan ................... 359/180 |
| 6,388,786 B1 | 5/2002 | Ono et al. |
| 6,411,117 B1 | 6/2002 | Hatamian ................ 324/765 |
| 6,421,155 B1 | 7/2002 | Yano |
| 6,445,476 B1 * | 9/2002 | Kahn et al. ............... 398/189 |
| 6,473,131 B1 | 10/2002 | Neugebauer et al. |
| 6,501,792 B1 | 12/2002 | Webster |
| 6,539,204 B1 | 3/2003 | Marsh et al. ............... 455/63 |
| 6,560,257 B1 | 5/2003 | DeSalvo et al. ......... 372/38.02 |
| 6,665,348 B1 | 12/2003 | Feher .................... 375/259 |
| 6,665,500 B1 | 12/2003 | Snawerdt |
| 6,718,138 B1 | 4/2004 | Sugawara ................... 398/9 |
| 6,751,587 B1 | 6/2004 | Thyssen et al. ............ 704/228 |
| 6,816,101 B1 | 11/2004 | Hietala et al. ............. 341/155 |
| 6,819,166 B1 | 11/2004 | Choi et al. ............... 327/551 |
| 6,961,019 B1 | 11/2005 | McConnell et al. ...... 342/357.1 |
| 2001/0024542 A1 | 9/2001 | Aina et al. ................ 385/24 |
| 2002/0086640 A1 | 7/2002 | Belcher et al. .............. 455/63 |
| 2002/0196508 A1 | 12/2002 | Wei et al. |
| 2003/0002121 A1 | 1/2003 | Miyamoto et al. |
| 2003/0008628 A1 | 1/2003 | Lindell et al. ........... 455/180.1 |
| 2003/0030876 A1 | 2/2003 | Takei .................... 359/187 |
| 2003/0053534 A1 | 3/2003 | Sivadas et al. ............ 375/229 |
| 2003/0058976 A1 | 3/2003 | Ohta et al. ............... 375/350 |
| 2003/0063354 A1 | 4/2003 | Davidson ................. 359/189 |
| 2003/0067990 A1 | 4/2003 | Bryant .................... 375/259 |
| 2004/0197103 A1 | 10/2004 | Roberts et al. ............ 398/159 |
| 2004/0213354 A1 | 10/2004 | Jones et al. .............. 375/285 |
| 2004/0218756 A1 | 11/2004 | Tang et al. ............... 379/417 |
| 2005/0069063 A1 | 3/2005 | Waltho et al. ............. 375/346 |

FOREIGN PATENT DOCUMENTS

| | | |
|---|---|---|
| EP | 0 584 865 B1 | 3/2000 |
| GB | 2 223 369 A | 4/1990 |
| GB | 2 306 066 A | 4/1997 |
| JP | 62082659 | 10/1988 |
| JP | 1990000063 162 | 11/1991 |
| JP | 04187738 | 7/1992 |
| JP | 08079186 A | 3/1996 |
| WO | WO 99/45683 | 9/1999 |
| WO | WO 01/41346 A2 | 6/2001 |
| WO | WO 02/067521 A1 | 8/2002 |
| WO | WO 2002/082694 A1 | 10/2002 |
| WO | WO 02/091600 A2 | 11/2002 |
| WO | WO 2003/071731 A1 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/050896 A2 | 6/2005 |

OTHER PUBLICATIONS

Borjak et al.; High-Speed Generalized Distributed-Amplifier-Based Transversal-Filter Topology for Optical Communication Systems; IEEE Transactions on Microwave Theory and Techniques; vol. 45, No. 8; Aug. 1997; pp. 1453-1457.

Buchali et al.; Fast Eye Monitor for 10 Gbit/s and its Application for Optical PMD Compensation; Optical Society of America; (2000); pp. TuP5-1-TuP1-3.

Cartledge et al.; Performance of Smart Lightwave Receivers With Linear Equalization; Journal of Lightwave Technology; vol. 10, No. 8; Aug. 1992; pp. 1105-1109.

Cimini et al.; Can Multilevel Signaling Improve the Spectral Efficiency of ASK Optical FDM Systems?; IEEE Transactions on Communications; vol. 41, No. 7; Jul 1993; pp. 1084-1090.

Downie et al.; Performance Monitoring of Optical Networks with Synchronous and Asynchronous Sampling; p. WDD50-1.

Enning et al.; Design and Test of Novel Integrate and Dump Filter (I&D) for Optical Gbit/s System Applications; Electronics Letters; (Nov. 21, 1991); vol. 27, No. 24; pp. 2286-2288.

Godin et al.; A InP DHBT Technology for High Bit-rate Optical Communications Circuits; IEEE; (1997); pp. 219-222.

Haskins et al.; FET Diode Linearizer Optimization for Amplifier Predistortion in Digital Radios; IEEE Microwave and Guided Wave Letters; vol. 10, No. 1; Jan. 2000; pp. 21-23.

Hranilovic et al.; A Multilevel Modulation Scheme for High-Speed Wireless Infrared Communications; IEEE; (1999); pp. VI-338-VI-341.

Jutzi, Wilhelm; Microwave Bandwidth Active Transversal Filter Concept with MESFETs; IEEE Transactions on Microwave Theory and Technique, vol. MTT-19, No. 9; Sep. 1971; pp. 760-767.

Lee et al.; Effects of Decision Ambiguity Level on Optical Receiver Sensitivity; IEEE Photonics Technology Letters; vol. 7, No. 19; Oct. 1995; pp. 1204-1206.

D. Marcuse; Calculation of Bit-Error Probability for a Lightwave System with Optical Amplifiers and Post-Detection Gaussian Noise; Journal of Lightwave Technology; vol. 9, No. 4; Apr. 1991; pp. 505-513.

Megherbi et al.; A GaAs-HBT A/D Gray-code converter; IEEE; (1997); pp. 209-212.

Nazarathy et al.; Progress in Externally Modulated AM CATV Transmission Systems; Journal of Lightwave Technology; vol. 11, No. 1; Jan. 1993; pp. 82-105.

Oehler et al.; A 3.6 Gigasample/s 5 bit Analog to Digital Converter Using 0.3 μm AlGaAs-HEMT Technology; IEEE; (1993); pp. 163-164.

Ota et al.; High-Speed, Burst-Mode, Packet-Capable Optical Receiver and Instantaneous Clock Recovery for Optical Bus Operation; Journal of Lightwave Technology; vol. 12, No. 2; Feb. 1994; pp. 325-331.

Poulton et al.; An 8-Gsa/s 8-bit ADC System; Symposium on VLSI Circuits Digest of Technical Papers; (1997); pp. 23-24.

Poulton et al.; A 6-b, 4 Gsa/s GaAs HBT ADC; IEEE Journal of Solid-State Circuits; vol. 30, No. 10.; Oct. 1995; pp. 1109-1118.

Poulton et al.; A 6-bit, 4 Gsa/s ADC Fabricated in a GaAs HBT Process; IEEE; (1994); pp. 240-243.

Prasetyo et al.; Application for Amplitude Gain Estimation Techniques for Multilevel Modulation in OFDM Systems; IEEE; (1998); pp. 821-824.

Shtaif et al.; Limits on the Spectral Efficiency of Intensity Modulated Direct Detection Systems with Optical Amplifiers; AT&T Labs Research; pp. MM1-1-MM1-3.

Su et al.; Inherent Transmission Capacity Penalty of Burst-Mode Receiver for Optical Multiaccess Networks; IEEE Photonics Technology Letters; vol. 6, No. 5; May 1994; pp. 664-667.

Wang et al.; Multi-Gb/s Silicon Bipolar Clock Recovery IC; IEEE Journal on Selected Areas in Communications; vol. 9, No. 5; Jun. 1991; pp. 656-663.

Webb, William T.; Spectrum Efficiency of Multilevel Modulation Schemes in Mobile Radio Communications; IEEE Transactions on Communications; vol. 43, No. 8; Aug. 1995; pp. 2344-2349.

Wedding et al.; Fast Adaptive Control for Electronic Equalization of PMD; Optical Society of America; (2000); pp. TuP4-1-TuP4-3.

Wilson et al.; Predistortion of Electroabsorption Modulators for Analog CATV Systems at 1.55 μm; Journal of Lightwave Technology; vol. 15, No. 9; Sep. 1997; pp. 1654-1662.

Author: Unknown; Digital Carrier Modulation Schemes; Title: Unknown; Date: Unknown; pp. 380-442.

International Search Report dated Sep. 26, 2002; International Application No. PCT/US02/14459.

Fürst et al.; Performance Limits of Nonlinear RZ and NRZ Coded Transmission at 10 and 40 Gb/s on Different Fibers; pp. 302-304.

Garrett, Ian; Pulse-Position Modulation for Transmission Over Optical Fibers with Direct or Heterodyne Detection; IEEE Transactions on Communications; vol. COM-31; No. 4; Apr. 1983; pp. 518-527.

Idler et al.; 40 Gbit/s Quaternary Dispersion Supported Transmission Field Trial Over 86 km Standard Singlemode Fibre; 24th European Conference on Optical Communication; Sep. 1998; pp. 145-147.

Ohtsuki et al.; BER Performance of Turbo-Coded PPM CDMA Systems on Optical Fiber; Journal of Lightwave Technology; vol. 18; No. 12; Dec. 2000; pp. 1776-1784.

Vorenkamp et al.; A 1Gs/s, 10b Digital-to-Analog Converter; ISSCC94/Session 3/Analog Techniquest/Paper WP 3.3; pp. 52-53.

Walkin et al.; A 10 Gb/s 4-ary ASK Lightwave System; ECOC; 1997; pp. 255-258.

Walklin et al.; Multilevel Signaling for Extending the Dispersion-Limited Transmission in High-Speed, Fiber Optic Communication Systems; IEEE; 1996; pp. 233-236.

Walklin et al.; Multilevel Signaling for Increasing the Reach of 10 Gb/s Lightwave Systems; IEEE Journal of Lightwave Technology; vol. 17; No. 11; Nov. 1999; pp. 2235-2248.

Wedding et al.; Multi-level Dispersion Supported Transmission at 20 Gbit/s Over 46 km Installed Standard Singlemode Fibre; 22nd European Conference on Optical Communication; 1996; pp. 91-94.

International Search Report dated May 29, 2003 for International Application No. PCT/US03/04626.

Chi et al.; Transmission Performance of All-Optically Labelled Packets Using ASK/DPSK Orthogonal Modulation; The 15th Annual Meeting of the IEEE Lasers and Electro-Optics Society, 2002; LEOS 2002; Nov. 10-14, 2002; vol. 1:51-52. The whole document.

Chiang et al.; Implementation of STARNET: A WDM Computer Communications Network; IEEE Journal on Selected Areas in Communications; Jun. 1996; vol. 14, No. 5; pp. 824-839.

Kaess et al.; New Encoding Scheme for High-Speed Flash ADC's; IEEE International Symposium on Circuits and Systems; Jun. 9-12, 1997; Hong Kong; pp. 5-8.

Kaiser et al.; Reduced Complexity Optical Duobinary 10-Gb/s Transmitter Setup Resulting in an Increased Transmission Distance; IEEE Photonics Technology Letters; Aug. 2001; vol. 13; No. 8; pp. 884-886.

Ohm et al.; Quaternary Optical ASK-DPSK and Receivers with Direct Detection; IEEE Photonics Technology Letters; Jan. 2003; vol. 15, No. 1; pp. 159-161.

Runge et al.; High-Speed Circuits for Lightwave Communications; 1999; World Scientific, pp. 181-184.

Vodhanel et al.; Performance of Directly Modulated DFB Lasers in 10-Gb/s ASK, FSK, and DPSK Lightwave Systems; Journal of Lightwave Technology; Sep. 1990; vol. 8, No. 9; pp. 1379-1386.

Wakimoto et al.; Si Bipolar 2-GHz 6-bit Flash A/D Conversion LSI; IEEE Journal of Solid-State Circuits; Dec. 1988; vol. 23, No. 6; pp. 1345-1350.

Westphal et al.; Lightwave Communications; 1994; Thursday Afternoon/CLEO '94; pp. 337-338.

Choi et al.; A 0.18-μm CMOS 3.5-Gb/s Continuous-Time Adaptive Cable Equalizer Using Enhanced Low-Frequency Gain Control Method; IEEE Journal of Solid-State Circuits; Mar. 2004; vol. 39, No. 3; pp. 419-425.

Paul, et al.; 3 Gbit/s Optically Preamplified Direct Detection DPSK Receiver With 116 photon/bit Sensitivity; Electronics Letters; vol. 29, No. 7, Apr. 1, 1993; pp. 614-615.

Penninckx et al.; Optical Differential Phase Shift Keying (DPSK) Direct Detection Considered as a Duobinary Signal; Proc. 27th Eur. Conf. on Opt. Comm. (ECOC'01—Amsterdam); vol. 3; Sep. 30 to Oct. 4, 2001; pp. 456-457.

Rohde et al.; Robustness of DPSK Direct Detection Transmission Format in Standard Fibre WMD Systems; Electronics Letters; vol. 36, No. 17; Aug. 17, 2000; pp. 1483-1484.

Shirasaki et al.; Fibre Transmission Properties of Optical Pulses Produced Through Direct Phase Modulation of DFB Laser Diode; Electronics Letters; vol. 24, No. 8; Apr. 14, 1988; pp. 486-488.

Weger et al.; Gilbert Multiplier as an Active Mixer with Conversion Gain Bandwidth of up to 17GHz; Electronics Letters;Mar. 28th 1991; vol. 27, No. 7; pp. 570-571.

Kannangara et al.; Adaptive Duplexer for Multiband Transreceiver; Radio and Wireless Conference; Aug. 10-13, 2003, RAWCON '03; pp. 381-384.

Kannangara et al.; Adaptive Duplexer for Software Radio; Approximate Date: Nov. 11-13, 2002.

Kannangara et al.; An Algorithm to Use in Adaptive Wideband Duplexer for Software Radio; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Williamson et al.; *Perfomance Analysis of Adaptive Wideband Duplexer*; 2003 Australian Telecommunications, Networks and Applications Conference (ATNAC); Dec. 8-10, 2003.

* cited by examiner

MULTILEVEL PULSE POSITION MODULATION FOR EFFICIENT FIBER OPTIC COMMUNICATION

PRIORITY AND RELATED APPLICATIONS

The present application claims priority to provisional patent application entitled, "Multilevel Pulse Position Modulation For Efficient Fiber-Optic Communication," filed on Mar. 29, 2001 and assigned U.S. patent application Ser. No. 60/279,655.

FIELD OF THE INVENTION

The present invention relates to optical fiber communication systems and more particularly relates to decreasing the transmitted power of signal transmission over an optical fiber communication channel, while maintaining channel bandwidth, through the use of multilevel pulse position modulation.

BACKGROUND OF THE INVENTION

In virtually all fields of communications, there exists a persistent demand to transmit more data in less time. The amount of information that can be transmitted over a communications system (or through a component of that system) is referred to as the bit rate or the data throughput of the system. Traditionally, system throughput is increased by either increasing the number of channels carrying information or increasing the bit rate of each channel. In order to meet ever-increasing bandwidth demands, aggregate throughput in fiber optic transmission systems has conventionally been increased by using multiple Wavelength Division Multiplexed (WDM) channels, time-division-multiplexing (TDM), or some combination of the two techniques. WDM techniques increase the number of channels transmitted on a particular fiber, while TDM techniques increase the data rate of each individual channel.

Conventional optical fiber networks typically can deliver on the order of 10 Gigabits of data per second (10 Gb/s). Both WDM and TDM techniques have been applied to realize fiber channel bit rates well above this conventional 10 Gb/s capacity. Many fiber optic communication systems comprise multiple WDM channels simultaneously transmitted through a single optical fiber. Each of these channels operates independently at a given bit rate, B. Thus for an m channel WDM system, the system throughput is equal to m×B. Conventional Dense WDM (DWDM) systems typically operate with 40 to 100 channels. There are certain restrictions, however, that limit the aggregate power that can be transmitted through a single DWDM optical fiber (i.e., the launch power). For example, eye safety power regulations and nonlinear effects in the fiber place limits on the aggregate launch power. In addition, channel spacing limitations and per-channel launch power, effectively limit the number of WDM channels that can be combined for transmission on a single fiber.

Optical fiber networks are typically comprised of a series of links that include a transmission block, a receiver block, and a long stretch of optical fiber connecting the two blocks (i.e., the optical plant). FIG. 1 is a block diagram of a conventional m-channel WDM fiber optic transmission system link 100. The fiber optic transmission system link 100 consists of a WDM transmission block 102 (denoted as the "Head"), the optical fiber 104, and a WDM reception block 106 (denoted as the "Terminal"). The Head 102 comprises m transmitters 108–112 (labeled "Tx") and an m-channel WDM multiplexer 114. Each transmitter 108–112 comprises an optical source (not shown) and all circuitry necessary to modulate the source with the incoming data stream. For the case of external modulation, the transmitter block also includes a modulator. The Terminal 106 comprises an m-channel WDM demultiplexer 116 and m receivers 118–122 (labeled "Rx"). Each receiver 118–122 comprises a photodetector (not shown) and all circuitry required to operate the detector and amplify the detected signal in order to output the original electrical data stream.

For 10 Gb/s transmission in optical fiber, chromatic dispersion can present a potentially significant transmission problem. Any transmitted optical signal will have a spectral width associated with it. As data rates increase for on-off key modulated signals, the spectral width of the modulated signal increases as well. Because the refractive index of a fiber medium, such as silica fiber is a function of wavelength, different components in the spectrum of the optical signal will travel at different velocities through the fiber. This phenomenon is known as chromatic dispersion, and it can present a significant source of distortion and inter-symbol interference (ISI) for high-speed optical transmission over long lengths of fiber. Conventional 10 Gb/s links of 75 kilometers or longer typically utilize some type of dispersion compensation to offset this effect. Such dispersion compensation is typically implemented in the form of dispersion-shifted fiber (DSF) that counteracts the dispersive effects of standard fiber.

In order to upgrade existing fiber optic transmission systems for 10 Gb/s signaling, dispersion compensation can become an even more complex issue. In order to realize channel data rates of 10 Gb/s and beyond, the optical fiber 104 as well as the Head 102 and Terminal 106 of the link 100 are typically upgraded to support the increased data rates. In order to increase the channel bit rates in this conventional link 100, each transmission block 102 and reception block 106 must be replaced with optical components and circuitry capable of achieving the desired bandwidths. For high-speed channel bit rates (10 Gb/s and faster), the optical fiber 104 also must often be replaced in order to compensate for signal distortions, which are more prominent at higher data rates. This process can be particularly cumbersome and costly in a long-haul link where hundreds of kilometers of fiber must be replaced. For existing long-haul optical links, the complexity and cost of replacing planted fiber often represents a prohibitive barrier for increasing channel bit rates.

Service providers seeking to optimize revenue and contain cost prefer a highly granular, incremental expansion capability that is cost effective while retaining network scalability. The ability to increase the throughput capacity of single point-to-point links or multi-span links without upgrading or otherwise impacting the remainder of the network is highly desirable from an engineering, administrative and profitability standpoint. It is also desirable to decrease the power required to transmit a signal over an optical fiber communication system. However, power efficiency cannot normally be realized at the cost of data throughput rates.

Dense wavelength division multiplexing (DWDM) technology currently enables high aggregate data rates in long-haul fiber optic transmission systems. The maximum power per WDM channel on a single fiber link is limited by several well-known nonlinear effects including self-phase modulation (SPM), cross-phase modulation (XPM), four-wave mixing (FWM), stimulated Brillouin scattering (SBS), and stimulated Raman scattering (SRS). Since a given fiber optic system will have inherent limits on the maximum total power that can be transmitted on a single fiber, these nonlinear effects ultimately limit the maximum number of channels, i.e., wavelengths, in a DWDM system. For many WDM systems, particularly long-haul transmission links, it is desirable to increase the number of WDM channels, thereby increasing the total aggregate data rate of the system.

In order to meet growing demands for higher data throughput in WDM fiber optic transmission systems, more channels per fiber are desired. The detrimental effects (such as channel cross-talk and signal-to-noise degradation) due to nonlinear interactions such as FWM increase as channel spacings decrease. Accordingly, simply narrowing the WDM channel spacing is not a completely satisfactory solution. However, because decreasing the transmitted power per channel can reduce many nonlinear effects in the system, one solution entails simultaneously reducing the power per channel and the channel spacing to realize a greater number of channels. Advantageously, decreasing the power per channel while maintaining the channel spacing can increase the transmission length of a given WDM system.

Compared to on-off keying (OOK), alternative modulation techniques such as pulse position modulation (PPM) can reduce the transmitted power per channel. However, in the specific case of PPM, the increased efficiency can be realized at the cost of decreased bandwidth. Using this method of modulation, a transmitted symbol, or cell, is divided into a discrete number of equally spaced temporal positions. One pulse, or chip, is transmitted per cell, occupying one and only one of the temporal positions within that cell. In this way, data is encoded into the temporal position of a chip within its particular cell.

As an example of the PPM format, FIG. 3 illustrates an 8-PPM (eight temporal positions per cell) data stream with a cell period of T and a chip duration of $\tau$, which is one eighth the cell period. This 8-PPM modulation format could be used to multiplex three independent OOK data streams (each with bit rates equal to $T^{-1}$) since there are eight ($2^3$) chip positions available in each cell. Assuming that each of the three multiplexed channels consists of a data stream with an equal percentage of 0s and 1s transmitted, the 8-PPM data stream as shown in FIG. 3 can operate at $\frac{1}{12}$ the average transmitted power of the three OOK channels combined.

Although PPM requires less average transmitted power than conventional OOK, overall bandwidth in the link is decreased. In order to multiplex n OOK channels (each with a bit rate of $T^{-1}$) in n-PPM format for optical transmission, the link would require electronics and optical components that could operate with bit rates of $2^n/T$. If we consider the example of 8-PPM shown in FIG. 3, the components required to transmit such a signal would need to be capable of operating at a bit rate of $8/T$ in order to transmit chips of duration $\tau=T/8$. However, the aggregate data rate of the 8-PPM system would be $3/T$ (number of channels·OOK channel bit rate). In general, in order to transmit an n-PPM data stream, components with a data rate of $2^n/T$ are required, but the aggregate data rate of the system would only be $n/T$. For high-speed fiber optic links, greater bandwidth is typically preferred over low power transmission, making PPM a less desirable solution for these applications.

PPM may also be used to reduce the average transmitted power on a single channel. For example, n consecutive bits in a OOK data stream (with a bit rate of B) may be encoded into a $2^n$-PPM signal with a cell period of n/B. In this case, the $2^n$-PPM signal would transmit $1/2^{n-1}$ the average transmitted power of the OOK data stream. However, the $2^n$-PPM signal would require components with data rates up to $2^n \cdot B/n$ to maintain the data rate of the incoming OOK signal. In other words, the transmitting and receiving components in the link must operate at data rates that are faster than the original data rate, B. As in the previous case, a trade-off exists between average transmitted power and the bandwidth of the components.

PPM has been used in free-space data transmission systems and has even been demonstrated for fiber optic transmission. Although PPM enables lower average transmission powers, the corresponding tradeoff with channel bandwidth has prevented its commercial implementation in conventional fiber optic systems, particularly long haul DWDM systems.

In view of the foregoing, there is a need to implement PPM in the context of a fiber optic communication system to reduce the required transmitted power. However, the use of PPM in the fiber optics communication system should not reduce the system throughput (i.e., bandwidth). The present invention combines multilevel amplitude modulation with PPM to achieve efficient optical data transmission without a subsequent decrease in channel bandwidth. Moreover, the PPM implementation should not require replacing an existing optical fiber plant or necessitate a change in the expensive optical components.

SUMMARY OF THE INVENTION

The present invention can be used to decrease the average transmitted power per Wavelength Division Multiplexed (WDM channel) using multilevel amplitude modulation in conjunction with pulse position modulation (PPM). The multilevel PPM method of the present invention does not entail any tradeoff between decreased power per channel and channel bandwidth, allowing for a lower average transmitted power compared to OOK with no reduction in aggregate data rate. Therefore, multilevel PPM is applicable to high-speed DWDM systems where the maximum number of channels is currently limited by nonlinear effects in the fiber. This modulation technique can enable an increased number of channels in DWDM systems, thereby increasing aggregate data rates within those systems.

The present invention enables the combination of N data streams into one m-level amplitude modulated n-PPM (n available temporal positions within each transmitted cell) data stream, where $m \cdot n = 2^N$. The m levels of amplitude modulation combined with the n chip positions within each cell allow for the $2^N$ independent symbols required for multiplexing N data streams. Accordingly, a 4×4-PPM signal has a cell duration of T ($=B^{-1}$) and a chip duration of $\tau=T/4$. The electronics and optical components required for the 4×4-PPM system must be capable of a data rate four times greater than B in order to generate chips with a duration of $\tau$. The 4×4-PPM system has an aggregate data rate of 4B, which is equal to the aggregate data rate of the four input data streams. The average transmitted power in the m×n-PPM system will be considerably less than that in a conventional OOK system, enabling a greater number of DWDM channels without degrading channel bandwidth.

The factor of improvement in average transmitted power depends on the amplitudes of the m levels in the m×n-PPM signal relative to the amplitude of the OOK signal. Where the amplitude of the OOK optical signal is equal to $A_{OOK}$, then the maximum amplitude (the $m^{th}$ level) of the m×n-PPM optical signal will typically be set in the range of $A_{OOK}$ to $2 \cdot A_{OOK}$, depending on the signal-to-noise ratio (SNR)

required in the link. The ratio of the average transmitted power of the optical m×n-PPM signal to that of a corresponding (same aggregate data rate) OOK signal is given by:

$$\frac{P_{avg,PPM}}{P_{avg,OOK}} = \frac{A_{PPM}}{A_{OOK}}\left(\frac{m+1}{mn}\right),$$

where $A_{PPM}$ is the maximum amplitude of the m×n-PPM signal and the assumption is made that chip duration is given by $\tau=T/n$. Returning to the simple case of 4×4-PPM, if $A_{PPM}=2 \cdot A_{OOK}$, the average transmitted power of the optical 4×4-PPM signal would be a factor of 5/8 lower than that of the OOK signal. If $A_{PPM}=A_{OOK}$, then the ratio would be 5/16. These reductions in average transmitted power can reduce nonlinear interactions in the optical fiber, enabling a greater number of DWDM channels and/or a greater transmission distance.

DESCRIPTION OF EXEMPLARY EMBODIMENTS

In an exemplary embodiment of the present invention, the average transmitted power in an optical fiber communication channel is decreased by using multilevel amplitude modulation in conjunction with Pulse Position Modulation (PPM). This multilevel PPM does not entail any tradeoff between decreased power per channel and channel bandwidth and, therefore, enables a lower average transmitted power compared to On/Off Keying (OOK) with no reduction in aggregate data rate. Accordingly, multilevel PPM can be used in high-speed Dense Wavelength Division Multiplexed (DWDM) optical communication systems where the maximum number of channels has traditionally been limited by nonlinear effects associated with WDM transmission through optical fiber. This modulation technique can enable an increased number of channels in DWDM systems, thereby increasing aggregate data rates within those systems.

Figure 2:
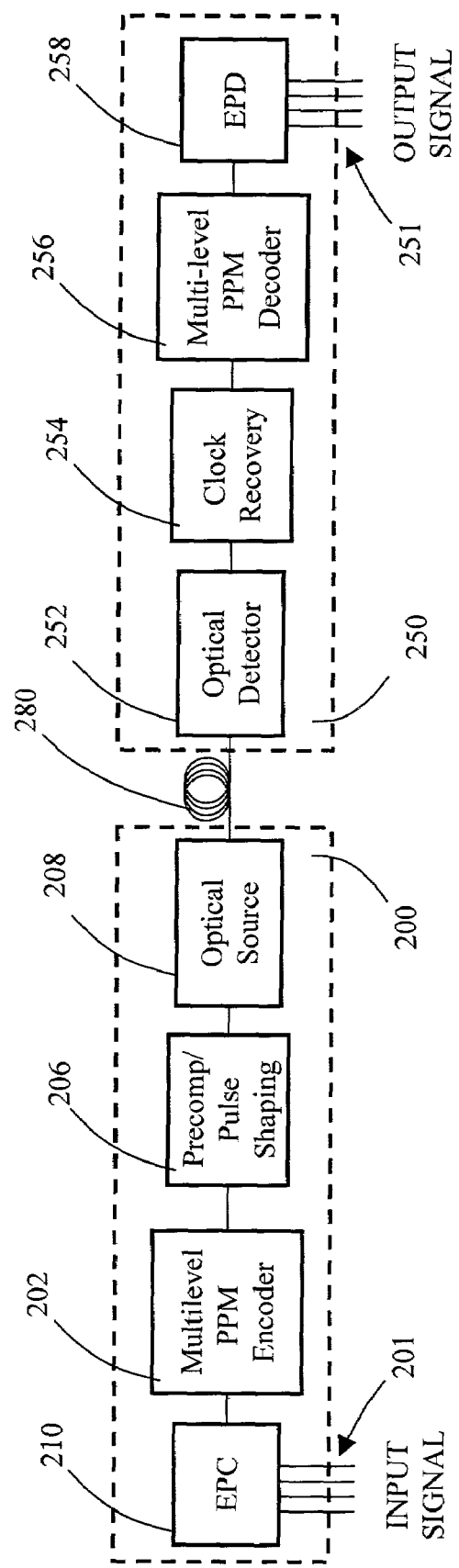
FIG. 2 is a block diagram depicting an exemplary operating environment in which an exemplary embodiment of the present invention can be implemented as an encoder.

FIG. 2 is a block diagram depicting an exemplary operating environment in which an exemplary embodiment of the present invention can be implemented as an encoder. Specifically, an exemplary embodiment of the present invention can be implemented as an encoder and/or decoder in an optical fiber communication link. FIG. 2 depicts an exemplary multilevel ASK optical transmitter 200 that can transmit an optical signal over an optical fiber 280 to a multilevel ASK optical receiver 250. The transmitter 200 typically receives m input sources 201 and comprises an error protection coding (EPC) module 210, an m-channel multilevel PPM encoder 202, which may include a Digital to Analog Converter DAC (not shown), a pre-compensation or pulse shaping circuit 206, and an optical source 208. The combination of the error protection coding (EPC) module 210, m-channel encoder 202, and pre-compensation/pulse shaping circuit 206 may be referred to as a symbolizer. The encoder 202 can map an m-bit word (that consists of a single bit from each of the m input data streams) into an n-bit word where n≧m. The input data can be processed by the EPC module 210 so that when decoded in the receiver, the processed data is error protected against bit errors introduced by the encoding/transmission/decoding process.

Pre-distortion of the transmitted data can help compensate for non-ideal link frequency response and for some classes of link non-linearities, effectively reducing pattern-dependent errors in the transmitted data. Hence, this technique is often referred to as pre-compensation and can be performed by the pre-compensation/pulse shaping module 206. Additionally, the pre-compensation/pulse shaping module 206 may perform pulse-shaping to maximize the dispersion distance (i.e., distortion-free transmission distance) of the signal in the optical fiber 280.

The receiver 250 typically comprises an optical detector 252, a clock recovery module 254, an n-channel PPM decoder 256, which can include an Analog to Digital Converter ADC (not shown), and an error protection decoding (EPD) module 258. The combination of the clock recovery module 254, n-channel decoder 256, and EPD module 258 may be referred to as a desymbolizer. The electronics of receiver 250 are termed the "desymbolizer", because they convert the received symbols back into one or more digital output data streams. The symbolizer may also include post-compensation circuitry (not shown) to further improve the recovered signal received from the transmitter 200.

The n-channel PPM decoder 256 converts the received multilevel PPM signal into a stream of n-bit words. The clock recovery circuit 254 can be used to generate the necessary timing signal to operate the encoder 256 as well as to provide timing for output synchronization. The n-bit words can be input to the EPD module 258, which converts a coded n-bit word for each clock cycle into the corresponding m-bit word that was initially input to the transmitter 200. The original data input to the transmitter 200 can then be obtained from the EPD 258 by decoding the error protected data using the redundant bits introduced by the transmitter's EPC 210 to correct errors in the received data. The EPD 258 can output the data in m digital data streams, as the data was originally input to the transmitter 200.

Compared to on-off keying (OOK), modulation techniques such as pulse position modulation (PPM) can be used to reduce the transmitted power per channel (i.e., increase power efficiency). However, the increased efficiency of PPM can simultaneously result in decreased bandwidth. Using PPM, a transmitted symbol, or cell, is divided into a discrete number of equally spaced temporal positions. One pulse, or chip, is transmitted per symbol, occupying one and only one of the temporal positions within that symbol. In this way, data can be encoded into the temporal position of a chip within its particular symbol.

Figure 3:
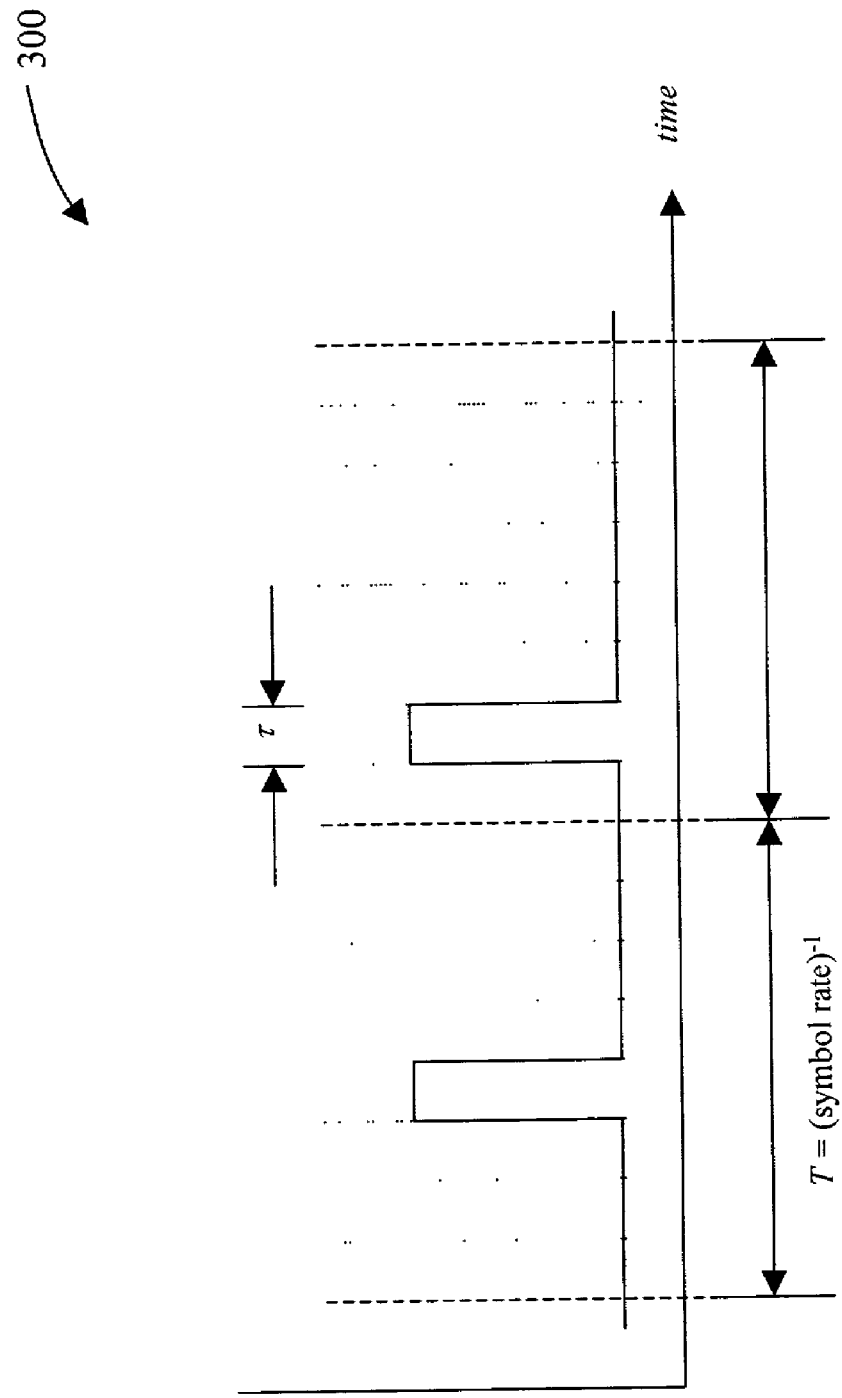
FIG. 3 is a graph depicting an exemplary pulse position modulated signal over a given time period.

FIG. 3 depicts an exemplary 8-PPM (eight temporal positions per cell) data stream 300 with a cell period of T and a chip duration of τ, which is one-eighth the cell period. As will be appreciated by those skilled in the art, chip duration need not be exactly equal to the spacing of the temporal positions within the symbol. The 8-PPM format can be used to multiplex three independent OOK data streams (each with bit rates equal to $T^{-1}$) since there are eight ($2^3$) chip positions available in each symbol. Assuming that each of the three multiplexed channels consists of a data stream with an equal percentage of 0s and 1s transmitted, the 8-PPM data stream 300 as shown in FIG. 3 will operate at $\frac{1}{12}$ the average transmitted power of the three OOK channels combined. Table 1 gives a truth table for multiplexing three separate channels into a single 8-PPM data stream.

TABLE 1

8-PPM Truth Table

| $D_1$ | $D_2$ | $D_3$ | Pulse Position |
|---|---|---|---|
| 0 | 0 | 0 | 1 |
| 1 | 0 | 0 | 2 |
| 0 | 1 | 0 | 3 |
| 1 | 1 | 0 | 4 |
| 0 | 0 | 1 | 5 |
| 1 | 0 | 1 | 6 |
| 0 | 1 | 1 | 7 |
| 1 | 1 | 1 | 8 |

In general, $2^n$ chip positions per cell are required to multiplex n OOK channels in PPM format. However, in an alternative embodiment, a guard time interval (not shown in FIG. 3) can be added at the end of each symbol to contain data that can be used to improve synchronization at the receiver. The addition of such a time interval to each symbol requires that chip position spacing within the symbol and chip duration are decreased to make room for the guard time interval. Accordingly, the average transmitted power required for the n-PPM data stream would be a fraction of that required by the n OOK channels. This fraction is described by the following equation:

$$\frac{P_{PPM}}{P_{OOK,total}} = \frac{1}{n \cdot 2^{n-1}}.$$

While PPM advantageously requires less average transmitted power than conventional OOK, it can have an adverse side effect: the overall bandwidth in the link can be decreased. In order to multiplex n OOK channels (each with a bit rate of $T^{-1}$) in n-PPM format for optical transmission, the link would require electronics and optical components capable of operating with bit rates of $2^n/T$. Returning to the exemplary 8-PPM format depicted in FIG. 3, the components required to transmit such a signal need to be capable of operating at a bit rate of 8/T in order to transmit chips of duration τ=T/8. However, the aggregate data rate of the 8-PPM system would be 3/T (i.e., the number of channels times the OOK channel bit rate). Accordingly, components with a data rate of $2^n/T$ are required to transmit an n-PPM data stream, but the aggregate data rate of the system would only be n/T (i.e., the bandwidth is reduced). For high-speed fiber optic links, there is greater motivation to increase bandwidth than there is to decrease transmission power. Accordingly, PPM is a less than satisfactory solution for such applications. Various embodiments of the present invention can be used to overcome this adverse effect of PPM.

Figure 1:
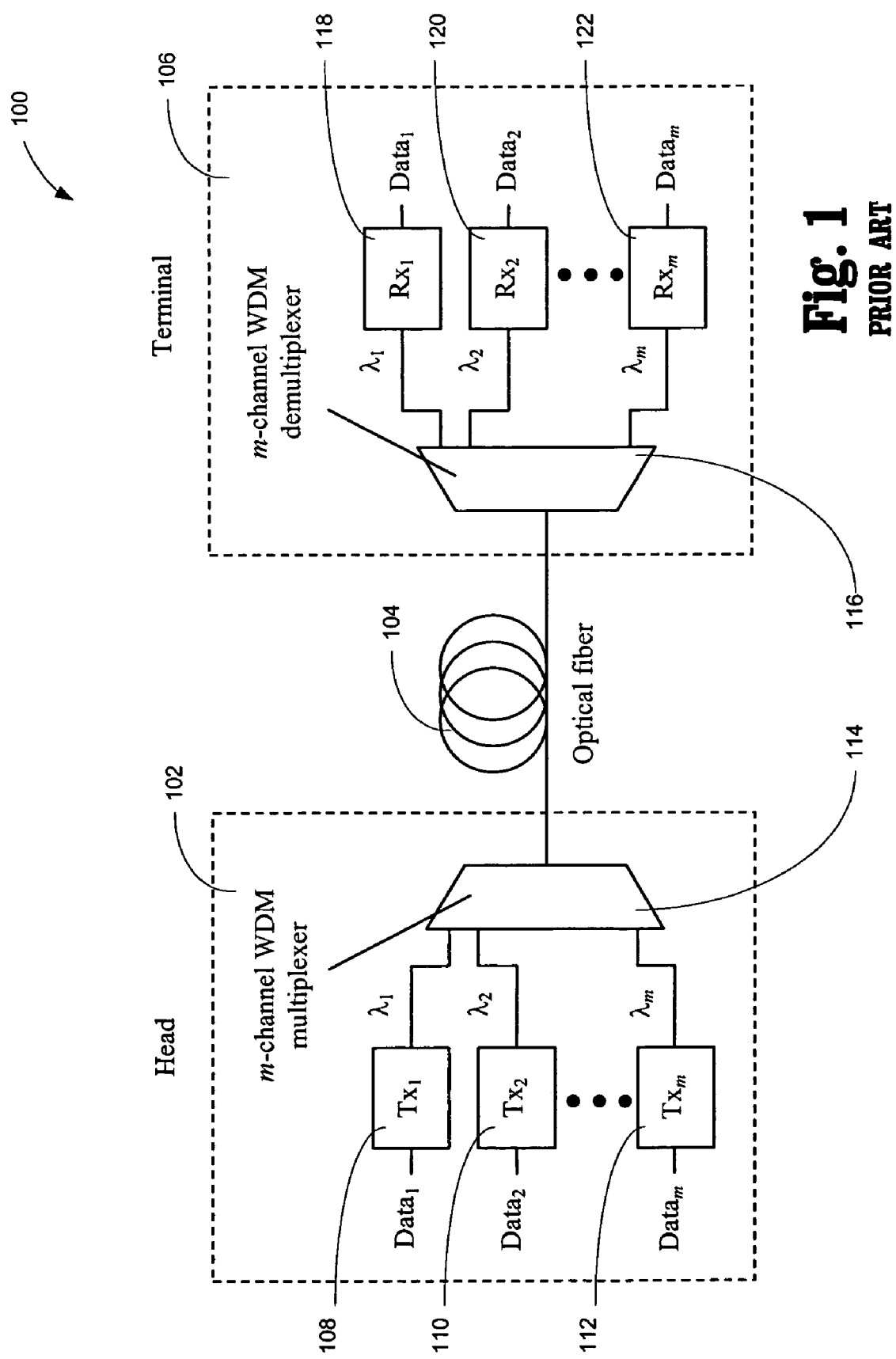
FIG. 1 is a block diagram of a conventional m-channel WDM fiber optic transmission system.

Although FIGS. 1–3 have been described in the context of n input streams (channels), those skilled in the art will appreciate that PPM may also be used to reduce the average transmitted power on a single channel. For example, n consecutive bits in an OOK data stream (with a bit rate of B) may be encoded into a $2^n$-PPM signal with a cell period of n/B. In this case, the $2^n$-PPM signal would transmit $1/2^{n-1}$ the average transmitted power of the OOK data stream. However, the $2^n$-PPM signal would require components with data rates up to $2^n \cdot B/n$ to maintain the data rate of the incoming OOK signal. In other words, the transmitting and receiving components in the link must operate at data rates that are faster than the original data rate, B. As described above, a trade-off exists between average transmitted power and the bandwidth of the components.

Various embodiments of the present invention can decrease the average transmitted power per Wavelength Division Multiplexed (WDM) channel, while maintaining bandwidth by implementing multilevel amplitude modulation in conjunction with PPM (i.e., multilevel PPM). Exemplary multilevel PPM methods of the present invention do not require a tradeoff between decreased power per channel and channel bandwidth, thereby enabling a lower average transmitted power (as compared with OOK) without a commensurate reduction in aggregate data rate. Therefore, multilevel PPM can be implemented in conventional high-speed DWDM systems where the maximum number of channels is traditionally limited by nonlinear effects such as SPM, XPM, FWM, SBS, and SRS. This modulation technique can enable an increased number of channels in DWDM systems, thereby increasing aggregate data rates within those systems.

Figure 4:
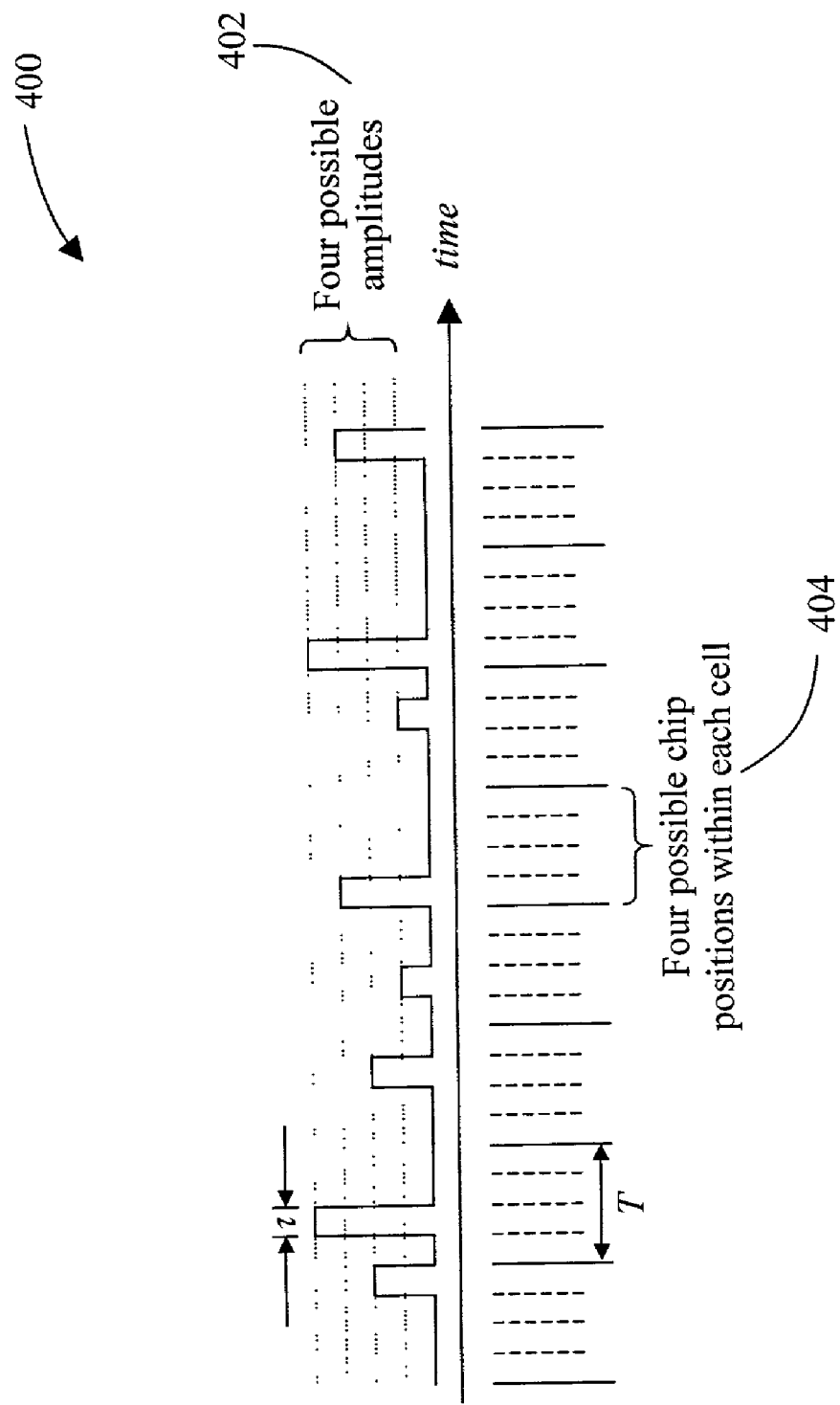
FIG. 4 is a graph depicting a multilevel pulse position modulated signal of an exemplary embodiment of the present invention.

In one embodiment of the present invention a method is provided for combining N data streams into one m-level amplitude modulated n-PPM (n available temporal positions within each transmitted symbol) data stream, where $m \cdot n = 2^N$. The m levels of amplitude modulation combined with the n chip positions within each cell allow for the $2^N$ independent symbols required for multiplexing N data streams. For clarity, such a modulation format will be denoted as m×n-PPM. As an example, the simplest case will be considered with N=4 (i.e., four input data streams) and m=n=4. FIG. 4 depicts a 4×4-PPM waveform 400 that is capable of producing 16 ($2^N$, N=4) independent symbols, based on unique pulse amplitudes 402 and unique temporal positions 404 within a symbol. It is assumed that each of the 4 independent data streams that are multiplexed into the waveform shown in FIG. 2 has a bit rate of B (where $B=T^{-1}$) and that the resulting 4×4-PPM signal has a symbol rate of B. Thus, the 4×4-PPM signal has a symbol duration of T and a chip duration of τ=T/4. In other words, the electronics and optical components required for the 4×4-PPM system must be capable of a data rate four times greater than B in order to generate chips with a duration of τ. This 4×4-PPM system has an aggregate data rate of 4B, which is equal to the aggregate data rate of the four input data streams.

One advantage of an m×n-PPM transmission system with an aggregate data rate of B' is revealed when compared to a single channel OOK system operating at the same bit rate of B'. The average transmitted power in the m×n-PPM system will be considerably less than that in the OOK system, enabling a greater number of DWDM channels without a degradation of channel bandwidth. The factor of improvement in average transmitted power depends on the amplitudes of the m levels in the m×n-PPM signal as compared to the amplitude of the OOK signal. If the amplitude of the OOK optical signal is equal to $A_{OOK}$, then the maximum amplitude (the $m^{th}$ level) of the m×n-PPM optical signal will typically be set in the range of $A_{OOK}$ to $2 \cdot A_{OOK}$, depending on the signal-to-noise ratio (SNR) required in the link. The ratio of the average transmitted power of the optical m×n-PPM signal to that of a corresponding (same aggregate data rate) OOK signal is given by:

$$\frac{P_{avg,PPM}}{P_{avg,OOK}} = \frac{A_{PPM}}{A_{OOK}} \left( \frac{m+1}{mn} \right),$$

where $A_{PPM}$ is the maximum amplitude of the m×n-PPM signal and the assumption is made that chip duration is given by $\tau = T/n$. Returning to the simple case of 4×4-PPM, if $A_{PPM} = 2 \cdot A_{OOK}$, the average transmitted power of the optical 4×4-PPM signal would be a factor of 5/8 lower than that of the OOK signal. If $A_{PPM} = A_{OOK}$, then the ratio would be 5/16. These reductions in average transmitted power can reduce nonlinear interactions in the optical fiber enabling either a greater number of DWDM channels or a greater transmission distance.

Figure 5:
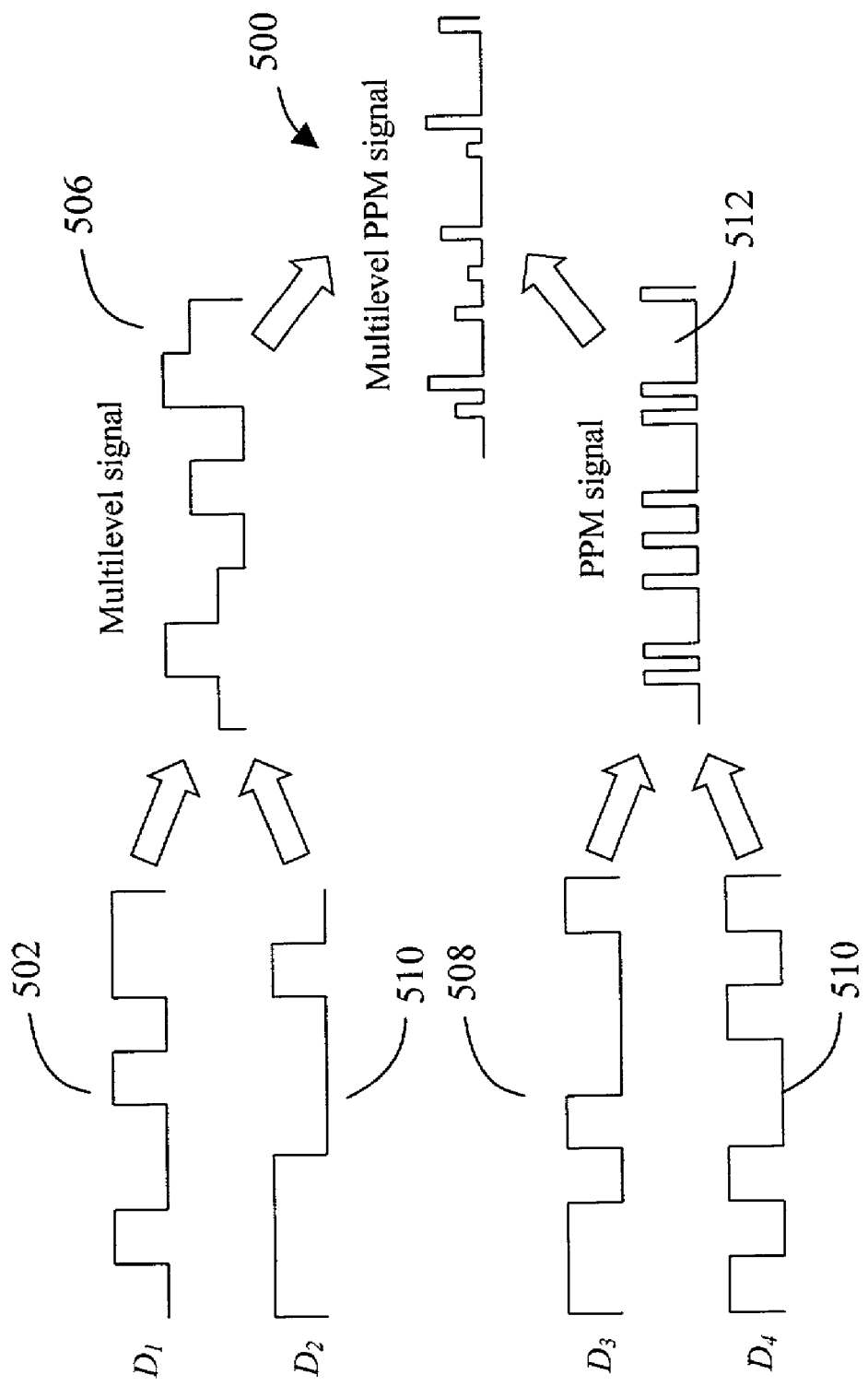
FIG. 5 is a block diagram depicting a method for generating a multilevel pulse position modulated signal that is an exemplary embodiment of the present invention.

FIG. 5 depicts an exemplary method for generating a multilevel 4×4-PPM signal 500. Two OOK data streams 502, 504 are combined into a multilevel signal 506, while two other OOK data streams 508, 510 are represented as chip positions in a 4-PPM signal 512. Next, the amplitude levels of the multilevel signal 506 are used to determine the amplitude of each transmitted chip in the PPM signal 512. In this manner, a 4×4-PPM signal 500 can be generated and used, for example, to drive an optical transmitter. It should be clear to those skilled in the art that more data streams 502, 504, 508, 510 (which will require more levels in the multilevel signal, more chip positions in the PPM cell, or both) may be multiplexed in this manner for even greater channel efficiency.

Figure 6:
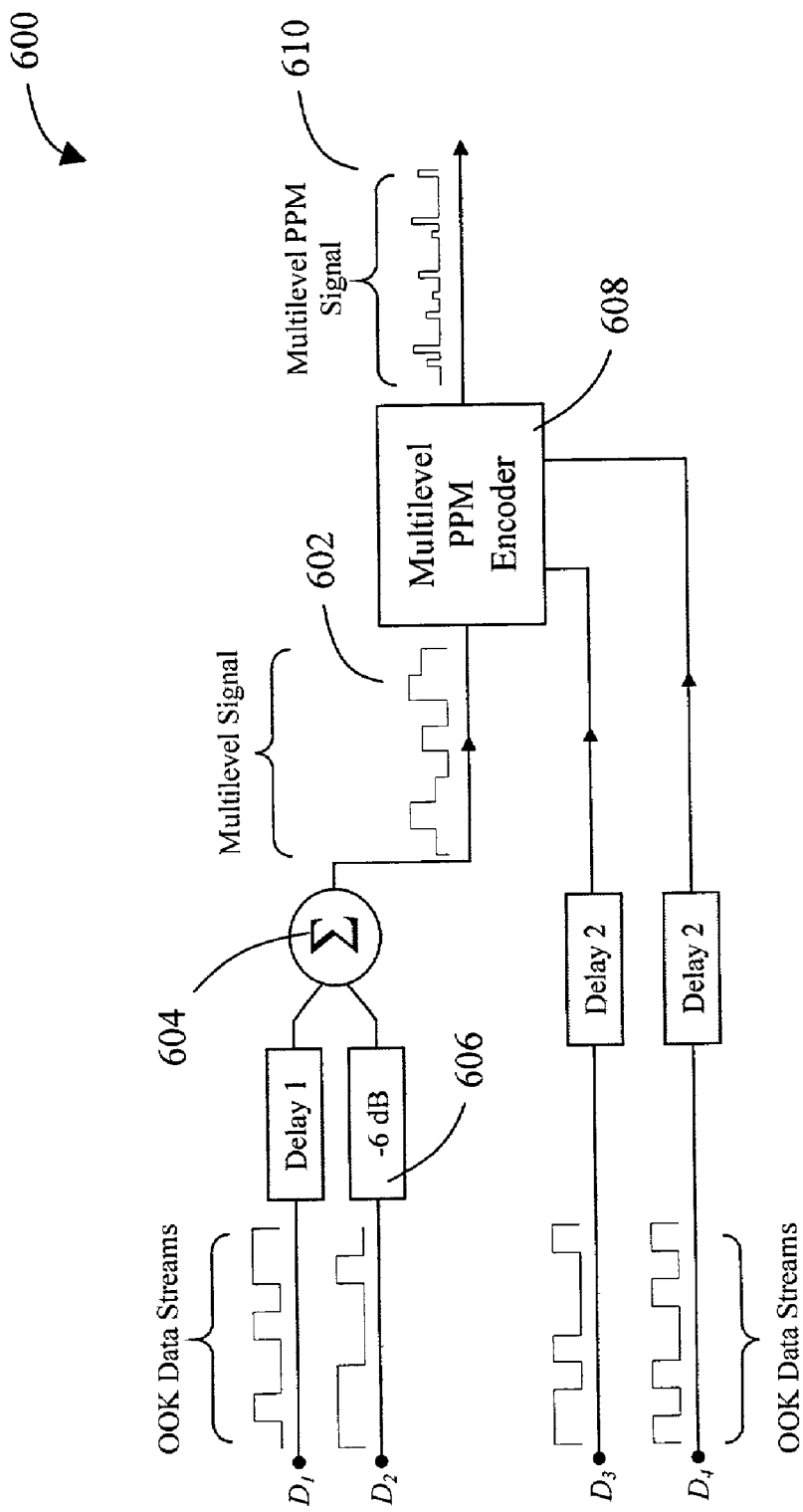
FIG. 6 is a block diagram of a transmission system for generating a multilevel pulse position modulated signal that is an exemplary embodiment of the present invention.

FIG. 6 depicts a transmission system 600 for generating a multilevel PPM signal. Four independent OOK electrical data streams $D_1$–$D_4$ are multiplexed into a single 4×4-PPM electrical signal 610 that can then be used to modulate an optical transmitter (not shown). In this example, each of the four OOK signals $D_1$–$D_4$ has the same bit rate, B. Two of the binary signals, $D_1$ and $D_2$, are combined by an adding element 604 to form a multilevel signal 602 with a symbol rate equal to B. Prior to summation, $D_2$ is attenuated by −6 dB by an attenuator 606, and $D_1$ is delayed by an amount equivalent to the delay applied to $D_2$ by the attenuator 606. The multilevel signal 602 is then sent to a multilevel PPM encoder circuit 08. Those skilled in the art will appreciate that a more sophisticated multilevel encoding scheme may be used to combine incoming data channels into a single multilevel amplitude waveform in order to maximize the SNR of the multilevel signal and enhance receiver sensitivity.

Referring still to FIG. 6, the signals $D_3$ and $D_4$ are also input to the encoder circuit 608 after each is appropriately delayed to ensure proper synchronization with the multilevel signal 602. The encoder circuit 608 generates a 4-PPM chip sequence based on the current bit combination of the signals $D_3$ and $D_4$. The amplitude level of each generated chip in the 4-PPM signal is set by the amplitude of the multilevel signal (plus a small DC component). The resulting signal is a 4×4-PPM waveform that can be used to modulate an optical transmitter. As a specific example, the four OOK signals $D_1$–$D_4$ can be assumed to each have bit rates of 2.5 Gb/s. The multilevel signal generated at the adding element 604 will then have a symbol rate of 2.5 Gsymbols/s. The transmitted 4×4-PPM signal would have a symbol rate of 2.5 Gcells/s and four temporal chip positions per cell. Thus, the electronic circuit of the encoder 608 and any downstream optical transmission components (modulator, laser, etc.) must be capable of operating at a data rate of 10 Gb/s. The aggregate data rate of the 4×4-PPM system would be 10 Gb/s. As described in more detail above, the average transmitted power of the 10 Gb/s 4×4-PPM system would be much less than that of a conventional 10 Gb/s OOK system.

The implementation depicted in FIG. 6 is described as an exemplary embodiment of the multilevel PPM of the present invention. It will be appreciated by those skilled in the art that more than two signals may be combined into a multilevel signal at the adding element 604 and that multiple data streams may be combined using well-known efficient coding techniques as opposed to a simple adding element. Likewise, more than two OOK signals could be input to the multilevel PPM encoder, requiring greater than four temporal positions per cell. However, as the number of input OOK data streams increases so will the complexity of the electronics, since a greater number of inputs will require faster components to avoid bottlenecking.

Figure 7:
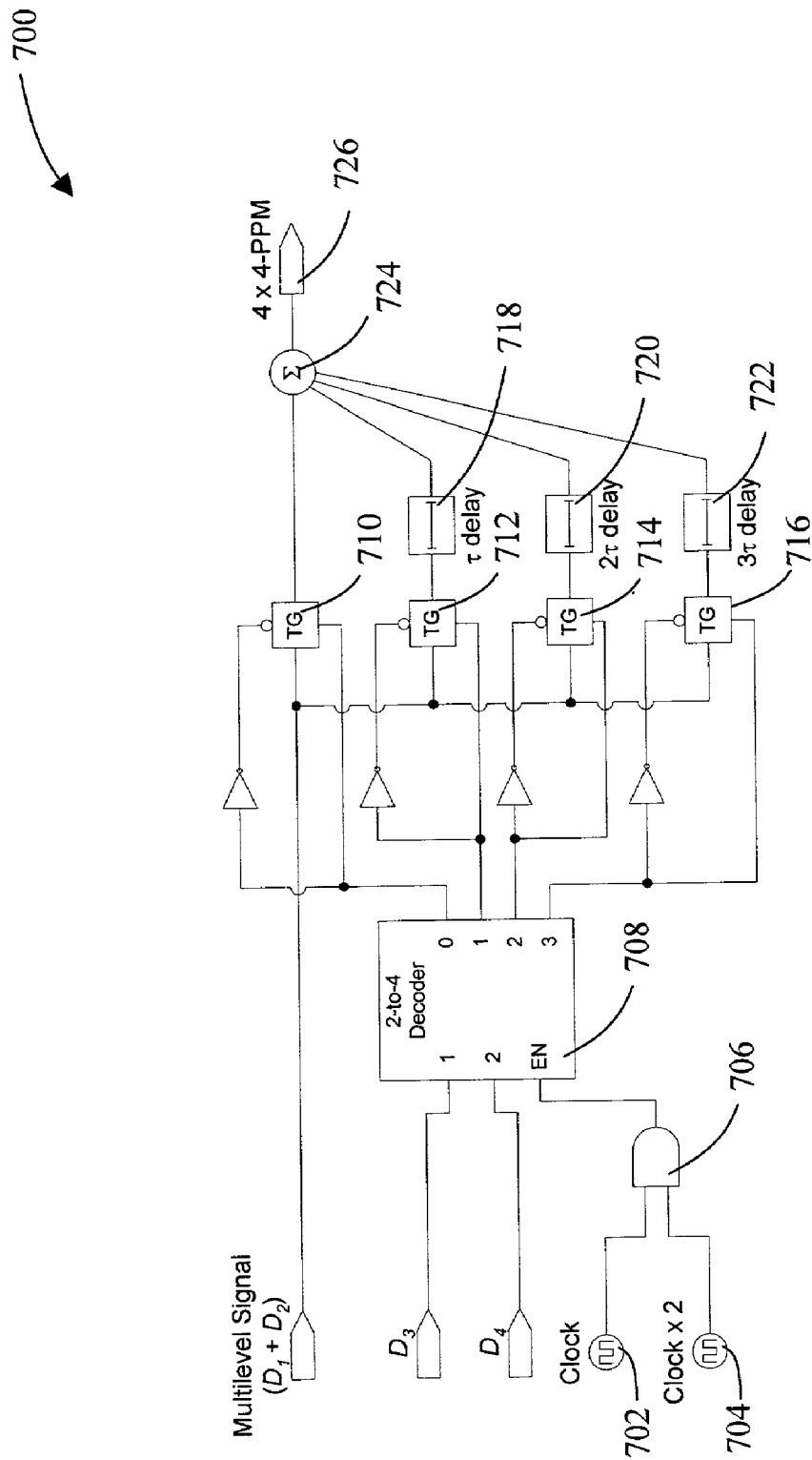
FIG. 7 is a block diagram of an encoding circuit for generating a multilevel pulse position modulated signal that is an exemplary embodiment of the present invention.

FIG. 7 depicts an exemplary embodiment of a multilevel PPM encoder circuit 700 for 4×4-PPM transmission. The inputs signals to the circuit include a multilevel signal that maintains greater than 1 bit per symbol (in this case, $D_1 + D_2$), two independent data channels ($D_3$ and $D_4$), a clock signal 702, and a "clock ×2" signal 704. The clock 702 and clock ×2 704 are input to an AND gate 706 in order to generate one pulse per bit with a temporal width equal to one chip duration, $\tau$. The generated pulse can be represented as a chip in the first position of a PPM signal with a cell period equal to the bit period of the incoming data signals $D_1$–$D_4$. This timing pulse is used as an ENABLE signal for a 2-to-4 decoder 708. The data signals $D_3$ and $D_4$ are input to the decoder 708. When the decoder 708 is enabled by the timing pulse, it transmits an "on" state to one of four output channels according to the truth table shown in Table 2.

TABLE 2

| Decoder Input | | | Decoder Output | | | |
| --- | --- | --- | --- | --- | --- | --- |
| ENABLE | $D_3$ | $D_4$ | Channel 0 | Channel 1 | Channel 2 | Channel 3 |
| 0 | X | X | 0 | 0 | 0 | 0 |
| 1 | 0 | 0 | 1 | 0 | 0 | 0 |
| 1 | 1 | 0 | 0 | 1 | 0 | 0 |
| 1 | 0 | 1 | 0 | 0 | 1 | 0 |
| 1 | 1 | 1 | 0 | 0 | 0 | 1 |

Because the decoder 708 is enabled only for a duration, $\tau$, for each bit, the output "on" state is also a pulse of duration $\tau$. Each output channel from the decoder acts as an ENABLE for a transmission gate (TG) 710–716. Each of the four transmission gates 710–716 is connected in parallel to the incoming multilevel signal ($D_1 + D_2$). Thus, when a transmitted pulse from the decoder 708 enables its associated transmission gate 710–716, the gate will transmit a pulse with an amplitude equal to that of a current bit from the multilevel signal and a pulse width equal to τ.

The multilevel signal may be generated with a DC offset at its lowest level (not shown in the figure) since a zero (0) amplitude may be indeterminable in a PPM format. The output of each transmission gate 710–716 has a corresponding delay 718–722 associated with it that effectively assigns the appropriate chip position (in a cell) to each transmitted multilevel pulse. The four channels are combined at an adding element 724 and the resulting waveform is a 4×4-PPM signal 726 that can be used to drive an optical transmitter. Those skilled in the art will appreciate than an m×n-PPM signal can be generated by using faster clock rates (for n chip positions) and a multilevel signal with m levels.

Figure 8:
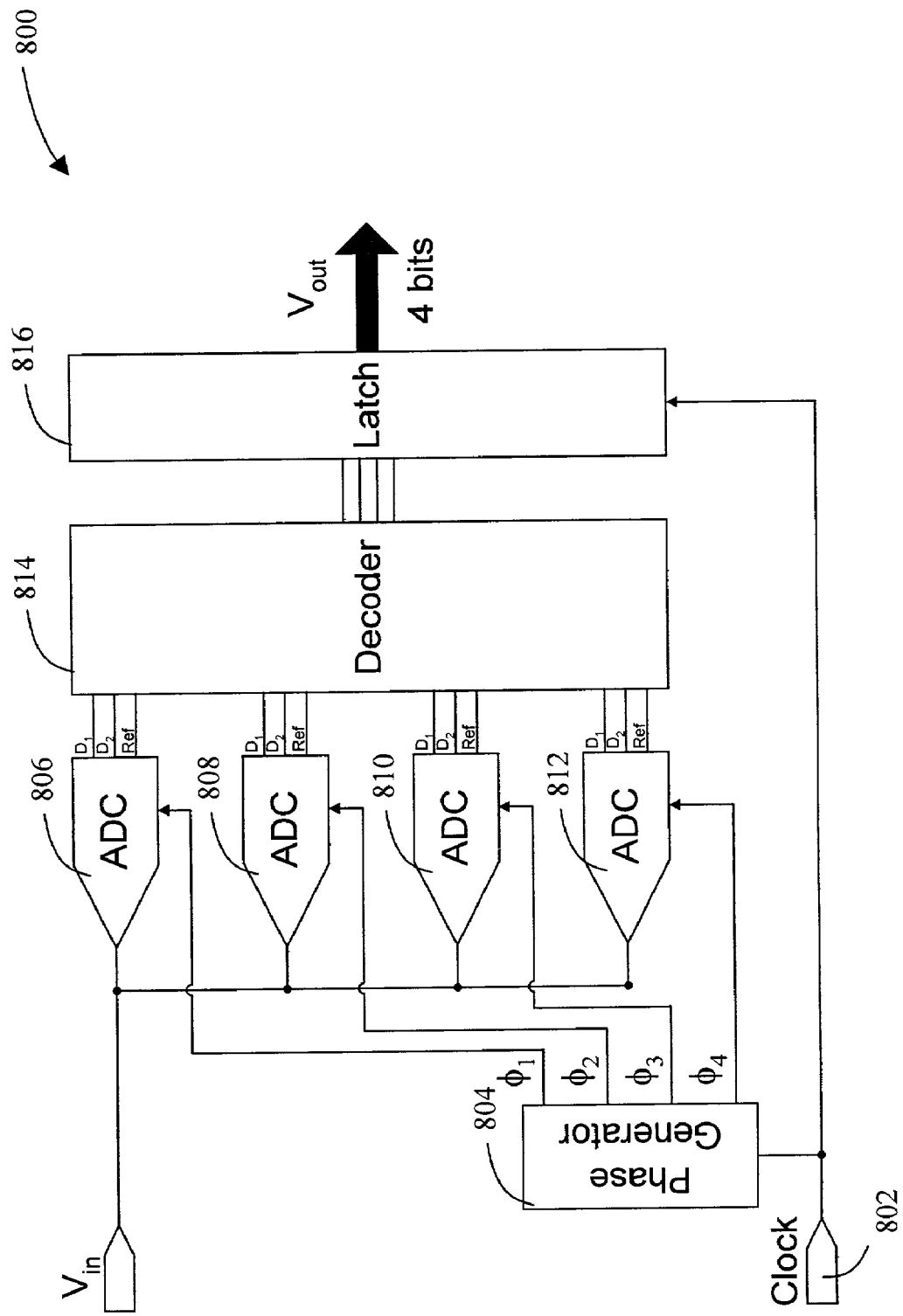
FIG. 8 is a block diagram of a receiving system for receiving and decoding a multilevel pulse position modulated signal that is an exemplary embodiment of the present invention.
Figure 9:
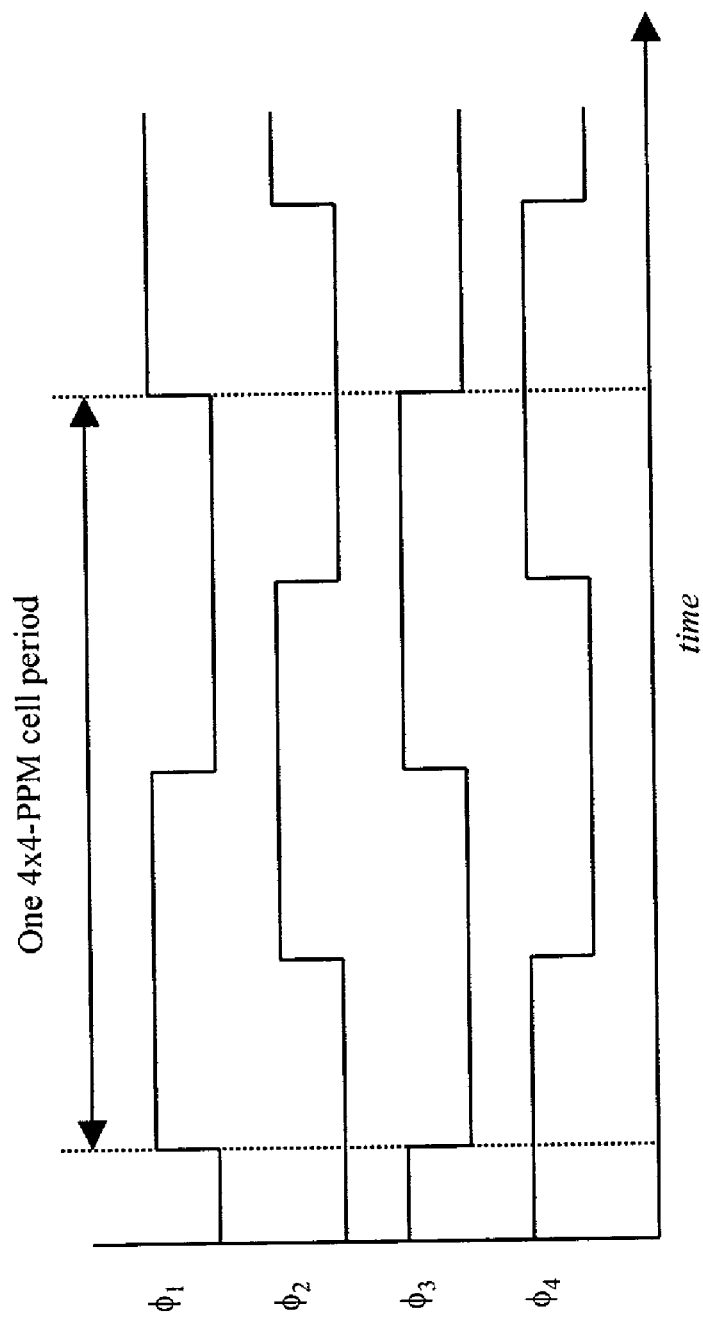
FIG. 9 is a graph depicting exemplary recovered clock signals that can be used by an exemplary receiving system to decode a pulse position modulated signal.

FIGS. 5–7 have been primarily devoted to the description of the transmission of a multilevel PPM signal, as opposed to the reception of a multilevel PPM signal. FIG. 8 depicts an exemplary embodiment of a multilevel PPM receiver 800. Specifically the receiver 800 of FIG. 8 could be implemented in connection with a 4×4-PPM modulation scheme. Those skilled in the art will appreciate that various well-known clock recovery methods, such as a phase-locked loop (PLL) method, can be used to generate a clock 802 at four times the cell rate from the received 4×4-PPM signal. The clock can then be frequency divided by four to produce a clock at the cell rate. The clock recovery step is implied in FIG. 8. For the receiver 800 of FIG. 8, the clock rate is equal to that of the received 4×4-PPM cell rate. For example, if the 4×4-PPM signal has a cell rate of 2.5 Gcell/s, the recovered and subsequently frequency divided clock 802 would have a rate of 2.5 GHz. The recovered clock 802 depicted in FIG. 8, is input to a phase generator 804 which generates four clock signals (φ1, φ2, φ3, and φ4) with the same rate as the input clock signal (not shown), each with a π/4 phase shift relative to its nearest neighbor. Exemplary clock signals (φ1–φ4) are illustrated in FIG. 9. Those skilled in the art will appreciate that the phase generator 804 can be a power splitter with four different delay lines on its four outputs. Alternatively, the phase generator 804 could be incorporated into the clock recovery circuit.

The 4×4-PPM signal (labeled Vin) in FIG. 8, is input to four separate 5-level (or log2(5)=2.322-bit) analog-to-digital converters (ADCs) 806–812. Each ADC 806–812 has three outputs, D1, D2, and Ref. Each ADC 806–812 is triggered to make a decision by the leading edge of one of the four clock signals that are output from the phase generator 804. The relative phase shifts of the clock signals ensure that, for each received cell, each of the 4 chip positions in the 4×4-PPM cell are evaluated by one of the ADCs 806–812 for a multilevel intensity-modulated pulse. The outputs of each ADC are input to a decoder circuit 814, depicted in FIG. 8. The 2.322-bit ADCs 806–812 in FIG. 8 can operate with four decision thresholds to accommodate the fact that the received 4×4-PPM signal can have 5 possible amplitudes. A conventional 2-bit ADC operates with three decision thresholds for use with a 4-level amplitude modulated signal.

Figure 10:
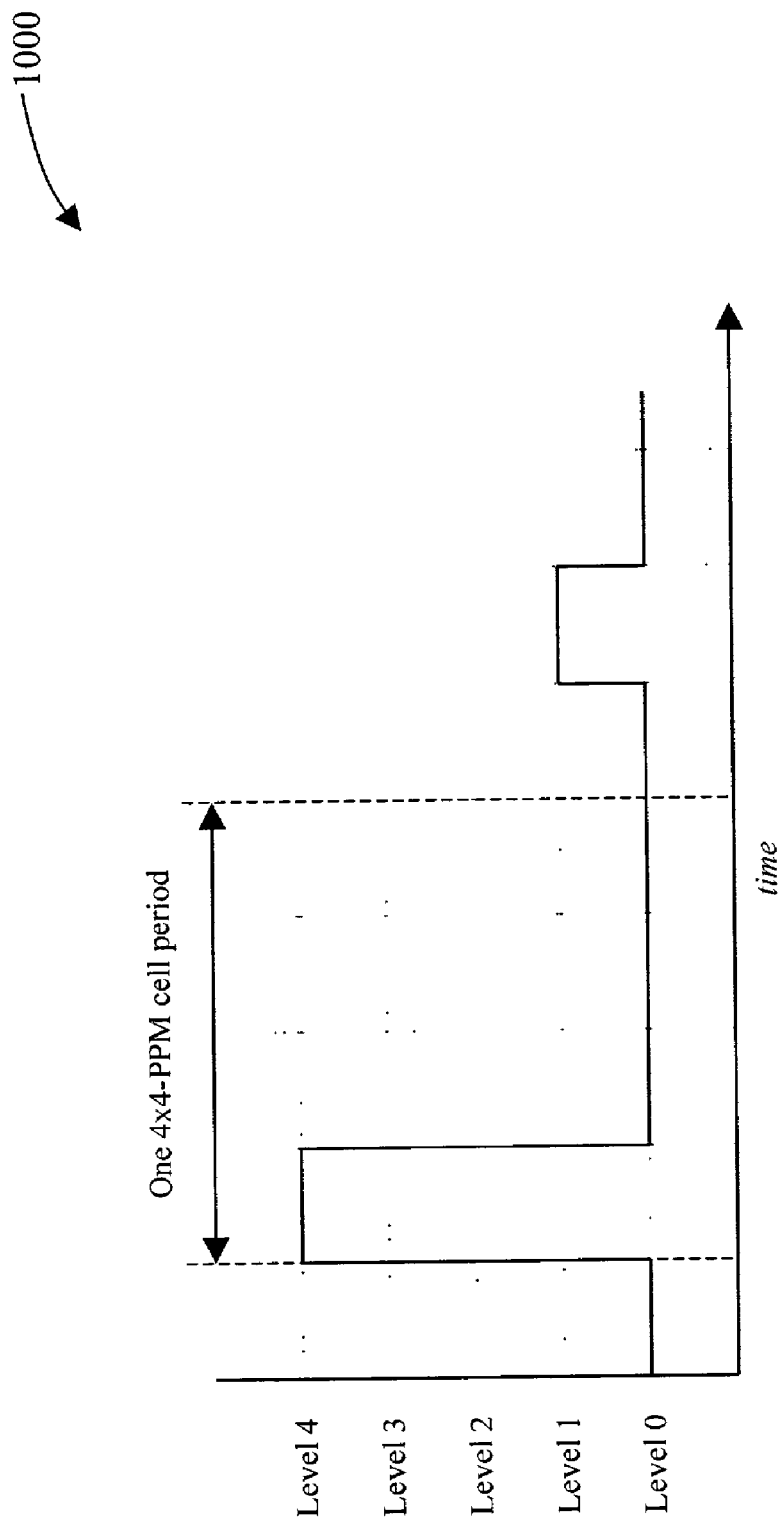
FIG. 10 is a graph depicting a five amplitude-level pulse position modulated signal of an exemplary embodiment of the present invention.

FIG. 10 depicts an exemplary 4×4-PPM signal 1000, where Levels 1–4 correspond to a 4-level amplitude modulated signal, while Level 0 signifies an empty chip position within the PPM cell. Accordingly, if a triggered ADC receives Levels 1, 2, 3, or 4, the ADC will output two parallel bits based on the input amplitude level on the outputs D1 and D2 (FIG. 8). However, if the triggered ADC receives Level 0, the ADC will output a special bit on the Ref (FIG. 8) output which signifies to the decoder 814 that D1 and D2 (FIG. 8) do not carry any information.

For each cell cycle, the decoder circuit 814 uses the four Ref outputs from the ADCs 806–812 to determine both the chip position for the current cell as well as which of the ADCs is outputting the "amplitude-encoded" data on channels D1 and D2. Those skilled in the art will appreciate that these decoding functions can be accomplished using various well-known combinational logic circuits. For each cell cycle, the decoder 814 outputs four bits (two "amplitude-encoded" bits from the appropriate D1 and D2 outputs and two "position-encoded" bits) to a latch 816 as depicted in FIG. 8. As the 4×4-PPM signal is transmitted through an optical communication system, the individual pulses may broaden in width, causing the ADCs to incorrectly output data on D1 and D2. Those skilled in the art will appreciate that the Decoder 814 can be designed to effectively select the strongest input signals, thereby reducing or eliminating errors that may result from chips broadening into neighboring positions. The latch 816 is triggered by the original recovered and frequency divided clock signal 802. The latch 816 outputs in parallel four bits per PPM cell cycle. Depending on the requirements of the system in which this 4×4-PPM receiver 800 is implemented, these bits may then be multiplexed to a single data stream that is four times the data rate of the four parallel streams.

The use of multilevel amplitude modulation can result in a signal-to-noise (SNR) penalty when compared with OOK modulation at an identical base symbol rate. Because this SNR penalty may manifest itself in multilevel PPM modulation as well, various embodiments of the present invention can include means for reducing an SNR penalty. Conventional methods for reducing or eliminating an SNR penalty include the use of Forward Error Correcting (FEC) codes as well as a combination of precompensation techniques and pulse-shaping techniques. Another technique applicable to various embodiments of the present invention can be implemented using the Decoder (814) of FIG. 8. Because a decoder can be used to effectively select (i.e., "vote" for) the strongest input signal, this "voting" mechanism in the decoder can be configured to enhance the effective sensitivity of the receiver. This would effectively reduce the SNR penalty associated with multilevel amplitude modulation. The inventors contemplate that those skilled in the art will appreciate that various techniques are well-known and available for overcoming an SNR penalty, any of which might be applicable to the reduction of an SNR penalty in the multilevel PPM modulation context.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for decreasing the transmitted power in a channel of an optical fiber communication system while maintaining a channel bandwidth, the method comprising the steps of:

receiving a digital input signal, comprising a series of input pulses, each input pulse having one of two pulse levels;

creating a digital input word having n bits from the digital input signal;

converting each digital input word to a corresponding output symbol representing one of $2^n$ distinct values; wherein the output symbol comprises a multilevel pulse position modulated symbol; and generating an output signal comprising a series of output symbols wherein the output signal has an aggregate data rate equal to a data rate of the input signal, and wherein the output signal has a lower transmitted power than an on-off modulated signal transmitting a series of on-off modulated output symbols at the aggregate data rate.

2. The method of claim 1 wherein the output symbol is characterized by representing one of a plurality of unique amplitudes.

3. The method of claim 1 wherein the output symbol is characterized by representing one of a plurality of unique chip positions.

4. The method of claim 1 wherein the transmitted power of the output signal is less than the transmitted power of the input signal by a factor of at least ½.

5. An optical fiber communication system comprising:
a multilevel pulse position modulation transmitter for combining n input signals for transmission over an optical fiber communication link as an encoded output signal;
wherein the encoded output signal comprises a series of multilevel pulse position modulated symbols, each symbol representing one of $2^n$ unique values; and
wherein a first transmission power required to transmit the encoded signal over the optical fiber communication link at a predetermined data rate is less than a second transmission power required to transmit an on-off modulated output signal over the optical fiber communication link at the predetermined data rate.

6. The optical fiber communication system of claim 5, wherein the first transmission power ($P_{FIRST}$) required to multiplex n on-off keyed input signals is a fraction of the second transmission power ($P_{SECOND}$) and is given by:

$$\frac{P_{FIRST}}{P_{SECOND}} = \frac{1}{n \cdot 2^{n-1}}.$$

7. The optical fiber communication system of claim 5, further comprising a receiver operative to receive the encoded signal from the optical fiber communication link and having a decoder operative to decode the encoded output signal into n output signals.

8. The optical fiber communication system of claim 7 wherein the n output signals are substantially identical to the n input signals.

9. A method for encoding n on-off keyed input signals into a single multilevel pulse position modulated output signal, the method comprising the steps of:

combining at least two of the n input signals into a multilevel signal;
representing at least two other of the n input signals as chip positions in a four position pulse position modulation signal; and
modifying at least one amplitude level of the four position pulse position modulation signal in accordance with at least one amplitude level of the multilevel signal to generate the single multilevel pulse position modulated output signal.

10. The method of claim 9, wherein the step of combining at least two of the n input signals into a multilevel signal comprises the steps of:
attenuating a first signal of the at least two of the n input signals; and
adding the first signal to a second signal of the at least two of the n input signals.

11. The method of claim 10, wherein the first signal is attenuated by 6dB.

12. The method of claim 10, further comprising the step of delaying the second signal for a first delay time, wherein the first delay time is equal to a second delay time imposed on the first signal by the attenuating step.

13. The method of claim 10, further comprising the step of delaying the at least two other of the n input signals for a third delay time, wherein the third delay time is equal to a fourth delay time imposed on the at least two of the n input signals by the attenuating step and the delaying the second signal step.

14. A transmitter for use in an optical fiber communications system, comprising:
a multilevel pulse position modulation encoding circuit operative to encode at least four on-off keyed input signals into a single multilevel pulse position modulated output signal;
a pulse shaping module for processing the output signal to maximize a dispersion distance of the output signal; and
an optical source for transmitting the output signal over a link of the optical fiber communications system, wherein the encoding circuit is operative to combine at least two of the on-off keyed input signals into a multilevel signal.

15. The transmitter of claim 14, wherein the encoding circuit is further operative to represent at least two other of the on-off keyed input signals as chip positions in a four position pulse position modulation signal.

16. The transmitter of claim 15, wherein the encoding circuit is further operative to modify at least one amplitude level of the four position pulse position modulation signal in accordance with at least one amplitude level of the multilevel signal.

* * * * *